(12) United States Patent
Youso et al.

(10) Patent No.: US 11,008,969 B2
(45) Date of Patent: May 18, 2021

(54) COMPRESSION IGNITION GASOLINE ENGINE

(71) Applicant: Mazda Motor Corporation, Hiroshima (JP)

(72) Inventors: Takashi Youso, Hiroshima (JP); Takashi Kaminaga, Hiroshima (JP); Masahisa Yamakawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 119 days.

(21) Appl. No.: 16/466,008

(22) PCT Filed: Dec. 1, 2016

(86) PCT No.: PCT/JP2016/085696
§ 371 (c)(1),
(2) Date: May 31, 2019

(87) PCT Pub. No.: WO2018/100708
PCT Pub. Date: Jun. 7, 2018

(65) Prior Publication Data
US 2019/0390627 A1   Dec. 26, 2019

(51) Int. Cl.
*F02M 26/00*   (2016.01)
*F02D 41/30*   (2006.01)
(Continued)

(52) U.S. Cl.
CPC ......... *F02D 41/30* (2013.01); *F02D 41/0062* (2013.01); *F02M 26/01* (2016.02);
(Continued)

(58) Field of Classification Search
CPC . F02M 26/01; F02D 41/0062; F02D 41/0065; F02D 41/006; F02D 2200/0611
See application file for complete search history.

(56) References Cited

U.S. PATENT DOCUMENTS 4,459,804 A * 7/1984 Nakajima ............... F02B 75/10
                                                    60/274
6,230,683 B1 * 5/2001 zur Loye ............... F02D 19/081
                                                    123/435
(Continued)

FOREIGN PATENT DOCUMENTS

JP    2001050070 A    2/2001
JP    2004340026 A    12/2004
(Continued)

OTHER PUBLICATIONS

Shibata, G., "Firing index of the fuel," Engine Review, vol. 3, No. 3, Jul. 1, 2013, 28 pages. Submitted with partial English translation.
(Continued)

*Primary Examiner* — Thomas N Moulis
(74) *Attorney, Agent, or Firm* — Alleman Hall Creasman & Tuttle LLP

(57) ABSTRACT

A compression ignition gasoline engine includes a fuel injection valve for injecting fuel containing gasoline as a main component into a cylinder; an EGR device operative to perform high-temperature EGR of introducing burnt gas generated in the cylinder into the cylinder at a high temperature; an octane number determination unit for determining whether fuel injected from the fuel injection valve has a prescribed octane number; and a combustion control unit for controlling the fuel injection valve and the EGR device in such a way that HCCI combustion occurs within the cylinder. The combustion control unit controls the EGR device, in at least a partial load operating range in which HCCI combustion is performed, in such a way that the EGR rate increases, as compared with a case where fuel is determined to have a prescribed octane number, when fuel is determined not to have a prescribed octane number.

11 Claims, 13 Drawing Sheets

(51) Int. Cl.
    *F02M 26/01* (2016.01)
    *F02D 41/00* (2006.01)
    *F02M 26/05* (2016.01)

(52) U.S. Cl.
    CPC ....... *F02M 26/05* (2016.02); *F02M 2026/001* (2016.02); *F02M 2026/009* (2016.02)

(56) References Cited

U.S. PATENT DOCUMENTS

| | | | | |
|---|---|---|---|---|
| 6,276,334 | B1* | 8/2001 | Flynn | F02D 13/0215 |
| | | | | 123/435 |
| 6,332,448 | B1* | 12/2001 | Ilyama | F02D 19/0605 |
| | | | | 123/304 |
| 6,912,992 | B2* | 7/2005 | Ancimer | F02D 41/3047 |
| | | | | 123/299 |
| 2005/0016496 | A1 | 1/2005 | Hitomi et al. | |
| 2008/0091334 | A1* | 4/2008 | Carlson | F02D 41/0025 |
| | | | | 701/105 |
| 2008/0202469 | A1* | 8/2008 | Kang | F02M 26/01 |
| | | | | 123/435 |
| 2013/0213349 | A1 | 8/2013 | Sellnau et al. | |
| 2013/0333677 | A1* | 12/2013 | Surnilla | F02D 41/24 |
| | | | | 123/674 |
| 2014/0060493 | A1 | 3/2014 | Iwai et al. | |
| 2016/0369762 | A1* | 12/2016 | Hakeem | F02P 5/1502 |
| 2017/0030275 | A1* | 2/2017 | Kuzuoka | G01M 15/12 |
| 2018/0112622 | A1* | 4/2018 | Atterberry | F02D 41/0025 |

FOREIGN PATENT DOCUMENTS

| | | |
|---|---|---|
| JP | 2005016408 A | 1/2005 |
| JP | 2005069143 A | 3/2005 |
| JP | 2010038012 A | 2/2010 |
| JP | 2014047643 A | 3/2014 |
| JP | 2016044670 A | 4/2016 |
| WO | 2010095258 A1 | 8/2010 |
| WO | 2012058280 A2 | 5/2012 |

OTHER PUBLICATIONS

Japan Patent Office, Office Action Issued in Application No. 2018553597, dated Feb. 25, 2020, 12 pages.

European Patent Office, Extended European Search Report Issued in Application No. 16922611.5, dated Sep. 20, 2019, Germany, 11 pages.

\* cited by examiner

ENGINE SPECIFICATION AND OPERATING CONDITION

| VALVE DRIVING | HYDRAULICALLY VARIABLE TYPE (4 VALVES) |
|---|---|
| BORE × STROKE (mm) | 87.5 × 83.1 |
| COMPRESSION RATIO | 20 |
| COMBUSTION CHAMBER | PENT-ROOF TYPE |
| FUEL SUPPLY | DIRECT INJECTION TYPE |
| ENGINE ROTATION NUMBER (rpm) | 1000 |
| INTAKE TEMPERATURE | 50 |
| COOLING WATER/OIL TEMPERATURE (°C) | 88 / 90 |

FIG.5

CHARACTERISTICS OF SAMPLE FUELS

| | | Para90 | Arom30 | Arom20 | Arom30-Ole20 | Arom30-Naph20 | ETBE20 | EtOH20 | Para80 |
|---|---|---|---|---|---|---|---|---|---|
| RON | | 91.2 | 90.1 | 90.6 | 91.0 | 90.1 | 91.5 | 91.4 | 82.5 |
| MON | | 89.8 | 85.0 | 86.7 | 82.7 | 83.8 | 89.3 | 86.8 | 84.3 |
| SENSITIVITY | | 1.4 | 5.1 | 3.9 | 8.3 | 6.3 | 2.2 | 4.6 | −1.8 |
| DENSITY | 15°C g/cm³ | 0.693 | 0.732 | 0.719 | 0.734 | 0.749 | 0.705 | 0.713 | 0.692 |
| VISCOSITY | 30°C mm²/s | 0.624 | 0.534 | 0.529 | 0.512 | 0.551 | 0.560 | 0.668 | 0.563 |
| SURFACE TENSION | 25°C mN/m | 18.7 | 19.6 | 19.5 | 19.8 | 20.8 | 18.4 | 18.9 | 18.5 |
| COMPONENT RATIO (vol%) | NORMAL PARAFFIN | 4.0 | 12.4 | 6.6 | 4.4 | 7.0 | 9.0 | 13.7 | 4.6 |
| | ISO-PARAFFIN | 96.0 | 58.1 | 72.8 | 46.3 | 43.8 | 70.7 | 65.4 | 95.3 |
| | OLEFIN | 0.0 | 0.0 | 0.0 | 20.5 | 0.0 | 0.2 | 0.0 | 0.0 |
| | NAPHTHENE | 0.0 | 0.1 | 0.1 | 0.1 | 19.9 | 0.0 | 0.1 | 0.1 |
| | AROMATICS | 0.0 | 29.4 | 20.4 | 28.7 | 29.2 | 0.0 | 0.0 | 0.0 |
| | BENZENE | 0.0 | 0.0 | 0.0 | 0.0 | 0.0 | 0.0 | 0.0 | 0.0 |
| | ETBE | 0.0 | 0.0 | 0.0 | 0.0 | 0.0 | 19.3 | 0.0 | 0.0 |
| | EtOH | 0.0 | 0.0 | 0.0 | 0.0 | 0.0 | 0.5 | 20.8 | 0.0 |

US 11,008,969 B2

COMPRESSION IGNITION GASOLINE ENGINE

TECHNICAL FIELD

The present invention relates to a compression ignition gasoline engine for combusting fuel containing gasoline as a main component within a cylinder by self-ignition.

BACKGROUND ART

An engine as disclosed in Patent Literature 1 is known as an example of a compression ignition gasoline engine as described above. In the engine of Patent Literature 1, HCCI combustion is performed in a predetermined operating range except for high load. Further, when the HCCI combustion is performed, internal EGR of letting burnt gas remain (flow back) in a cylinder is performed, and an EGR rate of the internal EGR (a ratio of EGR gas with respect to a total amount of gas to be introduced into a cylinder) is controlled to decrease, as load increases. Thus, fuel self-ignition is promoted, while suppressing combustion noise.

Herein, it is said that HCCI combustion is likely to be affected by a difference in fuel property, since HCCI combustion is combustion, which occurs by spontaneous reaction of fuel (gasoline) with oxygen in a high-temperature and high-pressure environment. In view of the above, particularly when fuel having a different octane number, which is an index of ignitability, is supplied to an engine, it is presumed that combustion of the fuel may be adversely affected such as the ignition timing is greatly deviated from an intended timing. For example, a user may inadvertently supply regular gasoline or high-octane gasoline, or an octane number may vary among fuel manufacturers, or the like. In view of the above, it is desired to provide a measure for enabling to continue an operation by HCCI combustion without any inconvenience, even if fuel having a different octane number is supplied by a reason as described above.

CITATION LIST

Patent Literature

Patent Literature 1: Japanese Unexamined Patent Application Publication No. 2014-47643

SUMMARY OF INVENTION

In view of the above, an object of the present invention is to provide a compression ignition gasoline engine capable of continuing HCCI combustion, even when fuel having an octane number different from a prescribed octane number is supplied.

As a means for solving the above issue, a compression ignition gasoline engine according to the present invention includes: a cylinder for accommodating a piston to be reciprocally movable; a fuel injection valve for injecting fuel containing gasoline as a main component into the cylinder; an EGR device operative to perform high-temperature EGR of introducing burnt gas generated in the cylinder into the cylinder at a high temperature; an octane number determination unit for determining whether fuel injected from the fuel injection valve has a prescribed octane number; and a combustion control unit for controlling the fuel injection valve and the EGR device in such a way that HCCI combustion in which fuel injected from the fuel injection valve self-ignites within the cylinder occurs. The combustion control unit controls the EGR device in such a way that, in at least a partial load operating range in which HCCI combustion is performed, an EGR rate increases, as compared with a case where fuel is determined to have a prescribed octane number, when the octane number determination unit determines that fuel does not have a prescribed octane number.

According to the present invention, since it is possible to suppress an ignition timing variation due to a difference in octane number, the present invention is advantageous in performing appropriate HCCI combustion, while allowing use of various types of fuels having different octane numbers.

BRIEF DESCRIPTION OF DRAWINGS

FIG. 5 is a table illustrating characteristics of a plurality of sample fuels used in the experiment.

Figure 1:
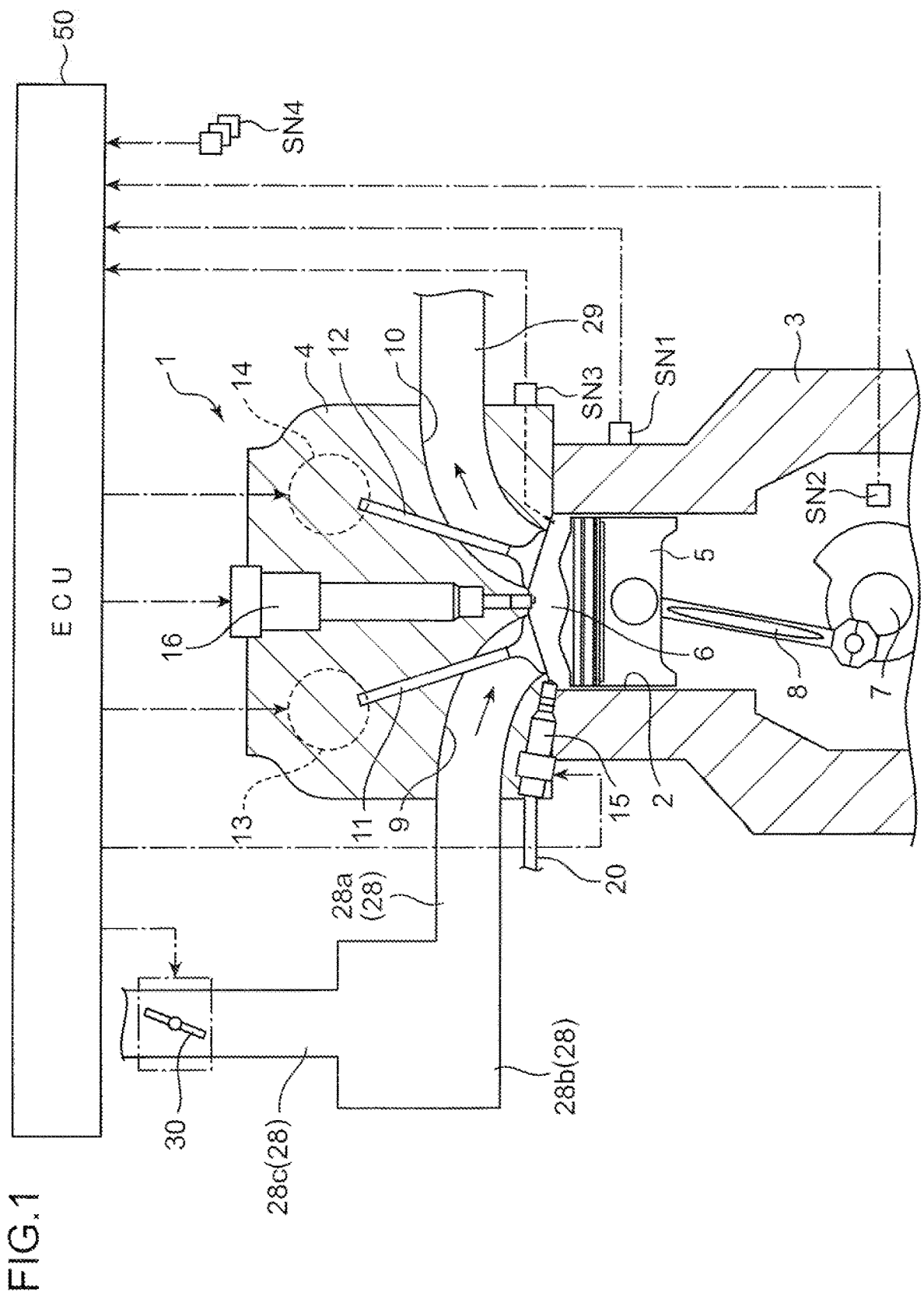
FIG. 1 is a system diagram schematically illustrating an overall configuration of a compression ignition gasoline engine according to an embodiment of the present invention.

DESCRIPTION OF EMBODIMENTS (1) Description on Embodiment
(1-1) Overall Configuration of Engine FIG. 1 is a system diagram schematically illustrating an overall configuration of a compression ignition gasoline engine according to an embodiment of the present invention. The engine illustrated in FIG. 1 is a 4-cycle multi-cylinder gasoline engine to be mounted in a vehicle, as a power source for driving. An engine body 1 of the engine is of a so-called in-line 4-cylinder type; and includes a cylinder block 3 having four cylinders 2 aligned in a row in a direction orthogonal to the plane of FIG. 1, a cylinder head 4 disposed on a top surface of the cylinder block 3 in such a way as to close the cylinders 2 from above, and a piston 5 that is received in each cylinder 2 to be reciprocally movable.

A combustion chamber 6 is formed above the piston 5. Fuel containing gasoline as a main component is supplied to the combustion chamber 6 by injection from a fuel injection valve 15 to be described later. Injected fuel is mixed with air, self-ignites in the combustion chamber 6, which undergoes high temperature and high pressure by compressing action of the piston 5, and is combusted. The piston reciprocally moves in an up-down direction when receiving an expanding force (depressing force) accompanied by the combustion.

Combustion by self-ignition, while mixing fuel with air as described above is called homogeneous charge compression ignition combustion (HCCI combustion). In order to perform the HCCI combustion, it is necessary to raise an internal temperature of the cylinder 2 to a sufficiently high temperature at a point of time when the piston 5 reaches a compression top dead center. In view of the above, in the present embodiment, a geometric compression ratio of each cylinder 2, namely, a ratio between the volume of the combustion chamber 6 when the piston 5 is at a top dead center, and the volume of the combustion chamber 6 when the piston 5 is at a bottom dead center is set to be not smaller than 18 but not larger than 22.

A crankshaft 7 being an output shaft of the engine body 1 is disposed below the piston 5. The crankshaft 7 is connected to the piston 5 via a connecting rod 8, and is driven and rotated around a central axis thereof, as the piston 5 reciprocally moves (up-down movement).

The fuel injection valve 15 is disposed in the cylinder head 4 for each cylinder 2. A fuel supply pipe 20 is connected to each of the fuel injection valves 15. Each fuel injection valve 15 supplies fuel of a required amount to each cylinder 2 by injecting fuel supplied from the fuel supply pipe 20 into the combustion chamber 6 by high-pressure injection.

Herein, an engine of the present embodiment is basically able to perform HCCI combustion in all operating ranges. However, in a condition that HCCI combustion is difficult such as in a cold state in which an engine water temperature is low, spark ignition combustion (SI combustion) in which a mixture of fuel and air (air-fuel mixture) is ignited is performed. In view of the above, a spark plug 16 for igniting the air fuel-mixture when SI combustion is performed is disposed in the cylinder head 4 for each cylinder 2.

A water temperature sensor SN1 and a crank angle sensor SN2 are disposed in the cylinder block 3. The water temperature sensor SN1 is a sensor for detecting a temperature (engine water temperature) of cooling water flowing through an unillustrated water jacket, which is formed inside the engine body 1. The crank angle sensor SN2 is a sensor for detecting a rotating angle (crank angle) of the crankshaft 7, and a rotation number (engine rotation number) of the crankshaft 7.

A cylinder pressure sensor SN3 is disposed in the cylinder head 4. The cylinder pressure sensor SN3 is a sensor for detecting an internal pressure of the cylinder 2 (a pressure of the combustion chamber 6).

An intake port 9 and an exhaust port 10, each of which is opened in the combustion chamber 6 of each cylinder 2, and an intake valve 11 and an exhaust valve 12 for opening and closing the ports 9 and 10 are provided in the cylinder head 4. The intake valve 11 and the exhaust valve 12 are driven to open and close in association with rotation of the crankshaft 7 by a valve mechanism including a pair of camshafts disposed in the cylinder head 4.

Each of an intake passage 28 and an exhaust passage 29 is connected to the cylinder head 4. The intake passage 28 is adapted to introduce air (fresh air) drawn from the outside into the combustion chamber 6, and is connected to one lateral surface of the cylinder head 4 in such a way as to communicate with the intake port 9. The exhaust passage 29 is adapted to discharge burnt gas (exhaust gas) generated in the combustion chamber 6 to the outside, and is connected to the other lateral surface of the cylinder head 4 in such a way as to communicate with the exhaust port 10.

A portion of the intake passage 28 from a position corresponding to the engine body 1 to an upstream position away from the engine body 1 by a predetermined distance is formed into branch passage portions 28a, each of which is branched for each cylinder 2. Upstream ends of the branch passage portions 28a are respectively connected to a surge tank 28b, which is common to the branch passage portions 28a. A common passage portion 28c of a single tubular shape is formed on an upstream side with respect to the surge tank 28b.

An openable/closable throttle valve 30 for adjusting an intake air amount into each cylinder 2 is provided in the common passage portion 28c.

A lift variable mechanism 13 capable of continuously (non-stepwisely) changing a lift amount of the intake valve 11 is incorporated in a valve mechanism for the intake valve 11. A type of the lift variable mechanism 13 is not limited, as far as it is possible to change the lift amount. However, for example, the lift variable mechanism may include a link mechanism for reciprocally and pivotally moving a cam for driving the intake valve 11 in association with rotation of a camshaft, a control arm for variably setting a disposition (lever ratio) of the link mechanism, and an actuator for changing a pivot amount of the cam (an amount of depressing the intake valve 11) by driving the control arm. Note that the lift variable mechanism 13 in the present embodiment is a variable mechanism of a type such that a valve timing (at least one of a valve open timing and a valve close timing) is changed accompanied by a change in lift amount.

An opening/closing switching mechanism 14 for validating or invalidating a function of depressing the exhaust valve 12 during an intake stroke is incorporated in a valve mechanism for the exhaust valve 12. Specifically, the opening/closing switching mechanism 14 has a function of opening the exhaust valve 12 not only in an exhaust stroke but also in an intake stroke, and switching whether a valve opening operation of the exhaust valve 12 in the intake stroke is performed or stopped. The opening/closing switching mechanism 14 may include, for example, a sub cam for depressing the exhaust valve 12 in an intake stroke, independently of an ordinary cam for driving the exhaust cam 12 (i.e. a cam for depressing the exhaust valve 12 in an exhaust stroke), and a so-called lost motion mechanism for cancelling transmission of a driving force of the sub cam to the exhaust valve 12.

Disposing the lift variable mechanism 13 and the opening/closing switching mechanism 14 in an engine of the present embodiment enables to perform internal EGR, which is an operation of letting burnt gas remain in the cylinder 2, and enables to adjust an EGR rate, which is a ratio of burnt gas to be introduced by the internal EGR with respect to a total amount of gas within the cylinder 2. Specifically, when the opening/closing switching mechanism 14 is driven in such a way as to validate opening of the exhaust valve 12 in an intake stroke, a part of burnt gas discharged from the cylinder 2 into the exhaust port 10 flows back to the cylinder 2. Thus, high-temperature burnt gas before being discharged to the exhaust passage 29 is drawn back to the cylinder 2 (in other words, substantially remains in the cylinder 2), and internal EGR is performed. Further, a lift amount/valve timing of the intake valve 11 is changed by the lift variable mechanism 13, and accordingly, an amount of air (fresh air) to be introduced to the cylinder 2 is changed. Thus, an EGR rate is adjusted. In this way, the lift variable mechanism 13 and the opening/closing switching mechanism 14 constitute a valve variable mechanism for performing internal EGR and adjusting an EGR rate thereof, and corresponds to an example of an "EGR device" in the claims.

(1-2) Control System

The units of the engine configured as described above are integrally controlled by an engine control unit (ECU) 50. As is well-known, the ECU 50 is a microprocessor constituted by a CPU, an ROM, an RAM, and the like; and corresponds to a "combustion control unit" and an "octane number determination unit" in the claims.

Various pieces of information are input to the ECU 50 from various types of sensors provided in the engine. Specifically, the ECU 50 is electrically connected to the water temperature sensor SN1, the crank angle sensor SN2, and the cylinder pressure sensor SN3; and acquires various pieces of information such as an engine water temperature, a crank angle, an engine rotation number, and a cylinder pressure, based on an input signal from each of the sensors SN1 to SN3.

Further, a vehicle-mounted sensor SN4 for detecting various pieces of information such as a traveling speed (vehicle speed) of a vehicle, and an opening angle (accelerator opening angle) of an accelerator pedal is disposed in the units of a vehicle, for example. The vehicle-mounted sensor SN4 is also electrically connected to the ECU 50. The ECU 50 acquires various pieces of information relating to a vehicle, such as a vehicle speed and an accelerator opening angle, based on an input signal from the vehicle-mounted sensor SN4.

The ECU 50 controls the units of the engine, while performing various calculations, based on information to be acquired from the sensors SN1 to SN4. Specifically, the ECU 50 is electrically connected to the lift variable mechanism 13, the opening/closing switching mechanism 14, the fuel injection valve 15, the spark plug 16, the throttle valve 30, and the like; and outputs a signal for controlling these pieces of equipment, respectively, based on a result of the calculations, and the like.

A more specific function of the ECU 50 is described. During operation of the engine, the ECU 50 determines whether either of HCCI combustion and SI combustion is to be performed, based on an engine water temperature detected by the water temperature sensor SN1, for example. Specifically, when an engine water temperature is lower than a predetermined value (cold state), SI combustion is selected; and when an engine water temperature is equal to or higher than the predetermined value (warm state), HCCI combustion is selected.

Further, the ECU 50 specifies an engine load (required torque), based on a vehicle speed, an accelerator opening angle, and the like detected by the vehicle-mounted sensor SN4, and specifies an engine rotation number, based on a change in crank angle detected by the crank angle sensor SN2. Then, the ECU 50 determines a target injection amount and a target injection timing of fuel to be injected from the fuel injection valve 15 into each cylinder 2, based on the above-described selection result on a combustion pattern (HCCI combustion or SI combustion), the specified engine load, and the specified engine rotation number; and controls the fuel injection valve 15 of each cylinder 2 in accordance with the determination. Specifically, fuel of the same amount as the target injection amount is injected from the fuel injection valve 15 at the same timing as the target injection timing. Further, the ECU 50 controls the throttle valve 30 in such a way that an opening angle of the throttle valve 30 coincides with a target opening angle to be set based on the above-described various conditions. Note that, when HCCI combustion is selected, an opening angle of the throttle valve 30 is kept to a large opening angle corresponding to a fully opened state, without depending on an engine load/rotation number.

Further, the ECU 50 determines whether it is necessary to perform internal EGR, which is an operation of letting burnt gas remain (flow back) in the cylinder 2, based on the above-described selection result on a combustion pattern, and an engine load/rotation number, determines a target EGR rate, which is a ratio of burnt gas to be introduced to the cylinder 2 by internal EGR, and controls the lift variable mechanism 13 and the opening/closing switching mechanism 14 in accordance with the determination. Specifically, when it is necessary to perform internal EGR, the ECU 50 drives the opening/closing switching mechanism 14 in such a way as to validate opening of the exhaust valve 12 in an intake stroke so as to perform internal EGR, and adjusts a lift amount/valve timing of the intake valve 11 by the lift variable mechanism 13 so as to introduce an amount of air (fresh air) and an amount of burnt gas associated with a target EGR rate into the cylinder 2.

(1-3) Control of Internal EGR depending on Load

Next, a specific example of control relating to the internal EGR is described with reference to a flowchart of FIG. 2 and a control map of FIG. 3. Note that the flowchart and the control map are applied, when HCCI combustion is selected as a combustion pattern. When SI combustion is selected, since internal EGR is basically unnecessary, description on control in a case where SI combustion is selected is omitted.

Figure 2:
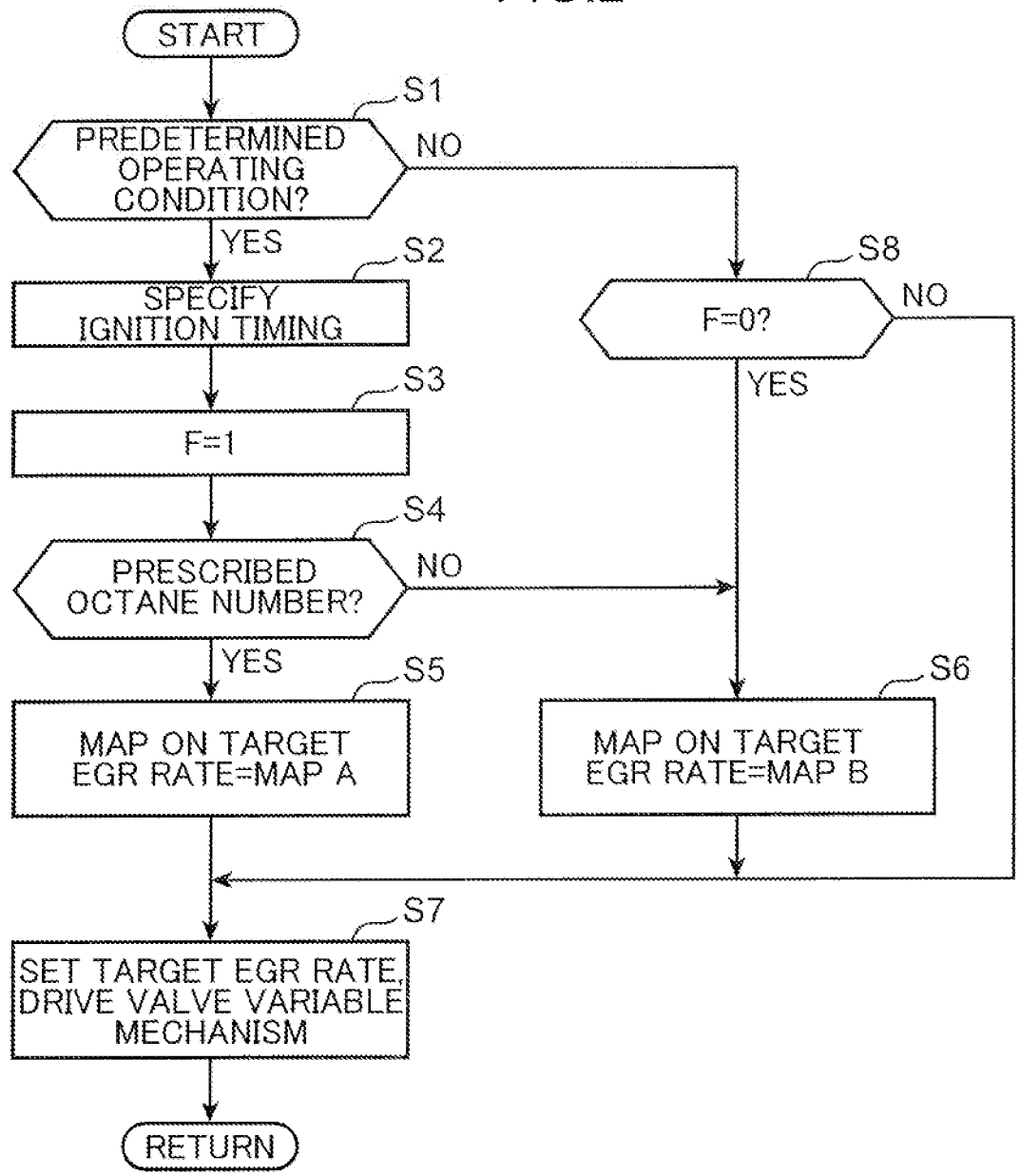
FIG. 2 is a flowchart illustrating a control procedure relating to internal EGR to be applied to the engine.

When the control illustrated in the flowchart of FIG. 2 is started, the ECU 50 determines whether an engine operating condition (a load and a rotation number), which is specified from detection values of the crank angle sensor SN2 and the vehicle-mounted sensor SN4 at a current point of time corresponds to a predetermined operating condition determined in advance as a condition capable of determining an octane number, which is performed in Step S4 to be described later (Step S1).

When the determination result in Step S1 is YES, and it is confirmed that the engine operating condition corresponds to the predetermined operating condition, the ECU 50 specifies a fuel ignition timing, based on a change in cylinder pressure detected by the cylinder pressure sensor SN3 (Step S2). Specifically, when fuel is ignited, a cylinder pressure sharply rises concurrently with the ignition. In view of the above, the ECU 50 determines that fuel is ignited at a point of time when a sharp rise of a cylinder pressure as described above is confirmed by the cylinder pressure sensor SN3.

Subsequently, the ECU 50 inputs "1" to a flag F for recording that determination of an octane number in Step S4 to be described later has been performed (Step S3). It is configured such that a default value of the flag F is "0", and the flag F is changed to "1", once the determination of an octane number is performed after the engine is started.

Subsequently, the ECU 50 determines whether injected fuel has a prescribed octane number, based on the fuel ignition timing specified in Step S2 (Step S4). Specifically, it is not always a case that intended fuel is replenished in a fuel tank for storing fuel supplied to the engine body 1. Unintended fuel may be replenished due to a user's inadvertent operation, or the like. When unintended fuel is replenished in a fuel tank as described above, there occurs a phenomenon that a fuel ignition timing differs even in the same operating condition due to a difference in octane number, which is an index representing fuel ignitability. In view of the above, the ECU 50 determines whether fuel currently supplied to the engine body 1 has a prescribed octane number, based on a comparison between an ignition timing specified in a predetermined operating condition (Step S2), and a predetermined reference ignition timing (an ignition timing, which is supposed to be acquired, when the fuel has a prescribed octane number). For example, when a difference between a specified ignition timing and a reference ignition timing is smaller than a predetermined value, it is determined that fuel has a prescribed octane number; and when the difference is equal to or larger than the predetermined value, it is determined that fuel does not have a prescribed octane number (fuel having an octane number different from a prescribed octane number is used). Note that, in the embodiment, fuel equivalent to commercially available regular gasoline is prescribed as fuel to be used. In Step S4, it is determined whether fuel has a prescribed octane number (e.g. 89 to 93 RON), based on a comparison with an ignition timing, which is acquired when the above-described fuel equivalent to regular gasoline is used.

Figures 3, 4:
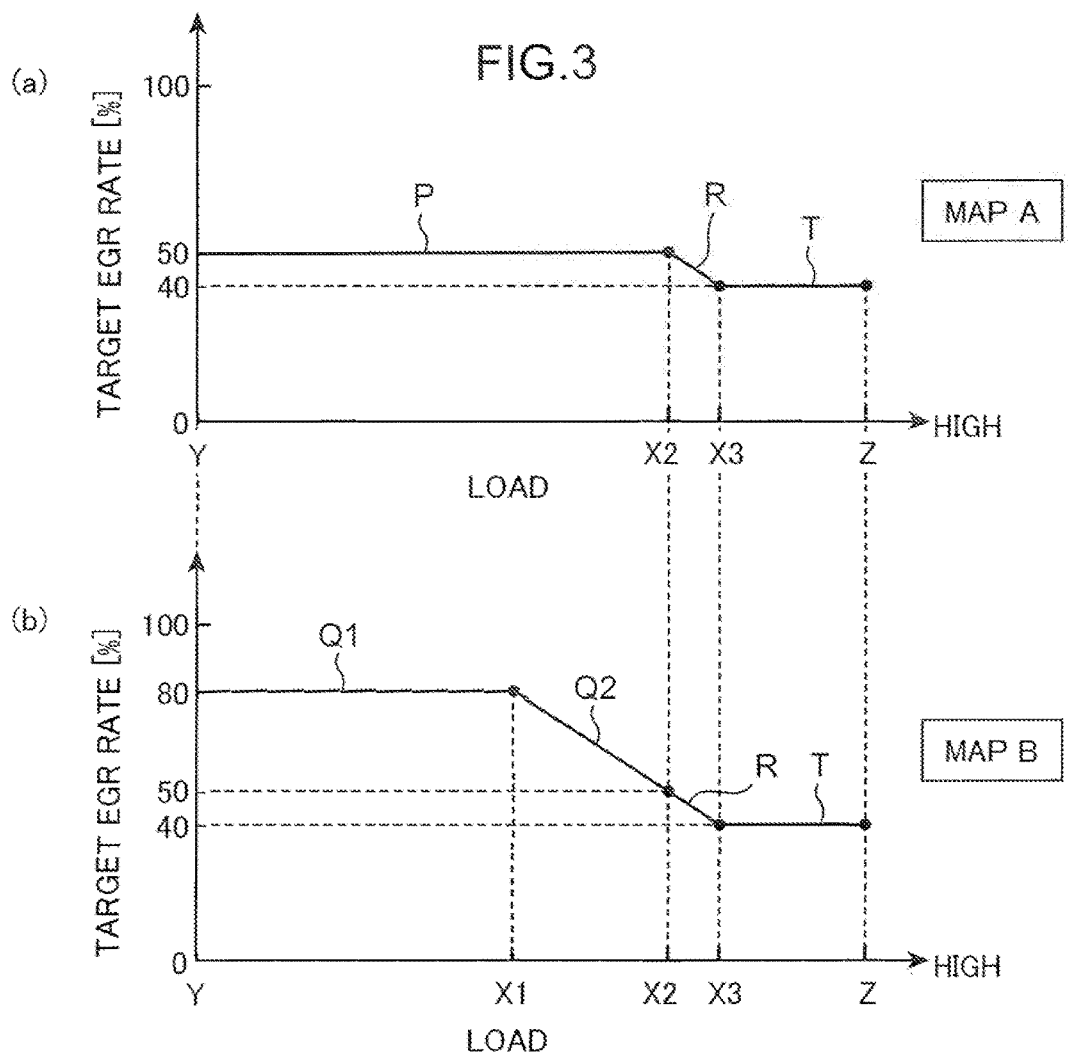
FIG. 3 is a diagram illustrating a map to be referred to in controlling the internal EGR.
FIG. 4 is a table illustrating an engine specification and an operating condition for an experiment used in a study as a basis of the embodiment.

When the determination result in Step S4 is YES, and it is determined that fuel having a prescribed octane number is used, the ECU 50 selects a map A illustrated in graph (a) of FIG. 3, as a map for setting a target EGR rate of internal EGR, namely, a target value of an EGR rate, which is a ratio of burnt gas to be introduced by internal EGR with respect to a total amount of gas within the cylinder 2 (Step S5). The map A indicates a target EGR rate to be set depending on an engine load, when an engine rotation number has a fixed value (e.g. 1000 rpm). Note that, even when an engine rotation number is different, only a numerical value (%) of a target EGR rate, or a threshold value (X2, X3) of load differs, and a tendency itself remains the same.

As illustrated in graph (a) of FIG. 3, when the map A is selected, a target EGR rate is uniformly set to 50% in a range from a lowest load Y corresponding to an idling operation to a second load X2 higher than the lowest load Y (see a zone P). In a range from the second load X2 to a third load X3 higher than the second load X2, as the load increases, the target EGR rate is gradually decreased (see a zone R), and is set to 40% at the third load X3. In a range from the third load X3 to a highest load Z, a target EGR rate is uniformly set to 40% (see a zone T).

On the other hand, when the determination result in Step S4 is NO, and it is determined that fuel having an octane number different from a prescribed octane number is used, the ECU 50 selects a map B illustrated in graph (b) of FIG. 3, as a map for setting a target EGR rate (Step S6). The map B indicates a target EGR rate to be set depending on an engine load, when the engine rotation number has a fixed value similarly to the map A (e.g. 1000 rpm). Note that, even when an engine rotation number is different, only a numerical value (%) of a target EGR rate, or a threshold value (X1, X2, X3) of load differs, and a tendency itself remains the same.

As illustrated in graph (b) of FIG. 3, when the map B is selected, a target EGR rate is uniformly set to 80% in a range from a lowest load Y corresponding to an idling operation to a first load X1 higher than the lowest load Y (see a zone Q1). In a range from the first load X1 to a second load X2 higher than the first load X1, as the load increases, a target EGR rate is gradually decreased (see a zone Q2), and also in a range from the second load X2 to a third load X3 higher than the second load X2, a target EGR rate is gradually decreased with a similar tendency (see a zone R), and is set to 40% at the third load X3. In a range from the third load X3 to a highest load Z, a target EGR rate is uniformly set to 40% (see a zone T).

When selection of a map is completed in Step S5 or S6, the ECU 50 sets a target EGR rate in accordance with the selected map (the map A or B), and controls the lift variable mechanism 13 and the opening/closing switching mechanism 14 in such a way that air and burnt gas of an amount associated with the set target EGR rate are introduced into the cylinder 2 (Step S7). Specifically, the ECU 50 drives the opening/closing switching mechanism 14 in such a way as to validate opening of the exhaust valve 12 in an intake stroke so as to perform internal EGR, and adjusts a lift amount/valve timing of the intake valve 11 by the lift variable mechanism 13 so as to introduce an amount of air (fresh air) and an amount of burnt gas associated with a target EGR rate into the cylinder 2.

Next, description is made regarding control in a case where the determination result in Step S1 is NO, in other words, when an engine operating condition does not correspond to the above-described predetermined operating condition (an operating condition capable of determining an octane number). In this case, the ECU 50 determines whether a value of the flag F is "0" (Step S8).

When the determination result in Step S8 is YES, in other words, when it is confirmed that determination of an octane number has never been performed after the engine is started, the ECU 50 proceeds to Step S6, and selects the map B illustrated in graph (b) of FIG. 3, as a map on a target EGR rate. Then, the ECU 50 sets a target EGR rate in accordance with the map B, and controls the lift variable mechanism 13 and the opening/closing switching mechanism 14 in such a way that air and burnt gas of an amount associated with the set target EGR rate are introduced into the cylinder 2 (Step S7).

On the other hand, when the determination result in Step S8 is NO, and it is confirmed that determination of an octane number has already been performed, the ECU 50 sets a target EGR rate in accordance with the already selected map (the map A or B), and controls the lift variable mechanism 13 and the opening/closing switching mechanism 14 in such a way that air and burnt gas of an amount associated with the set target EGR rate are introduced into the cylinder 2 (Step S7).

(2) Study as Basis of Present Invention

As described above, in the embodiment, internal EGR is performed during HCCI combustion, and an EGR rate of the internal EGR is configured to be variably set, based on a map (the map A or B) to be selected based on determination of an octane number. The present invention as represented by the present embodiment is achieved, based on a study by the inventors of the present application, which is conducted in order to examine an influence of a difference in fuel property on HCCI combustion. In the following, a content of this study is described in detail.

(2-1) Experiment Method and Sample Fuels (a) Experiment Method

A table of FIG. 4 illustrates an engine specification and an operating condition used in an experiment of the present study. In order to facilitate HCCI combustion, an experimental engine in which a geometric compression ratio was set to 20, which was higher than an ordinary engine, was prepared, and the engine was operated with natural aspiration at 1000 rpm. Further, similarly to the embodiment, the experimental engine includes a fuel injection valve for directly injecting fuel into a cylinder, and a valve variable mechanism (corresponding to the lift variable mechanism 13 and the opening/closing switching mechanism 14 in the embodiment) capable of changing valve characteristics of an intake valve and an exhaust valve. The valve variable mechanism is hydraulically driven. By controlling the valve variable mechanism to change valve characteristics of an intake valve and an exhaust valve, an EGR rate of internal EGR was variably set among 0%, 40%, 60%, and 80%, and a compression start temperature of a cylinder was changed. Note that in evaluating an experiment, G/F (gas-fuel ratio), which is a ratio between a total amount of working gas within a cylinder including fresh air and internal EGR gas, and a fuel amount, is used as an index for an operating condition. Further, in order to grasp a start timing of branched-chain reaction of fuel as an ignition timing of HCCI combustion, a point of time when a second-order differential of a heat generation rate became a maximum value was defined as an ignition timing.

(b) Sample Fuels

Figure 6:
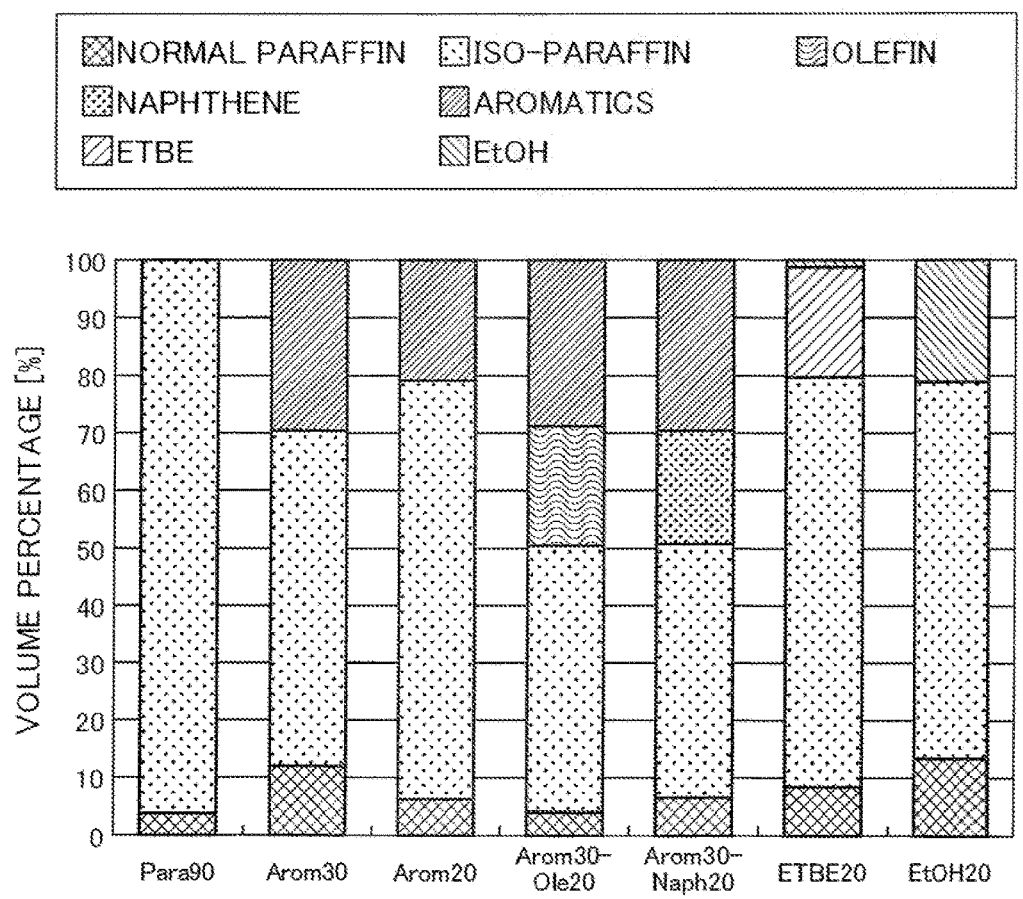
FIG. 6 is a graph illustrating volume percentages of components contained in each of the sample fuels.
Figure 7:
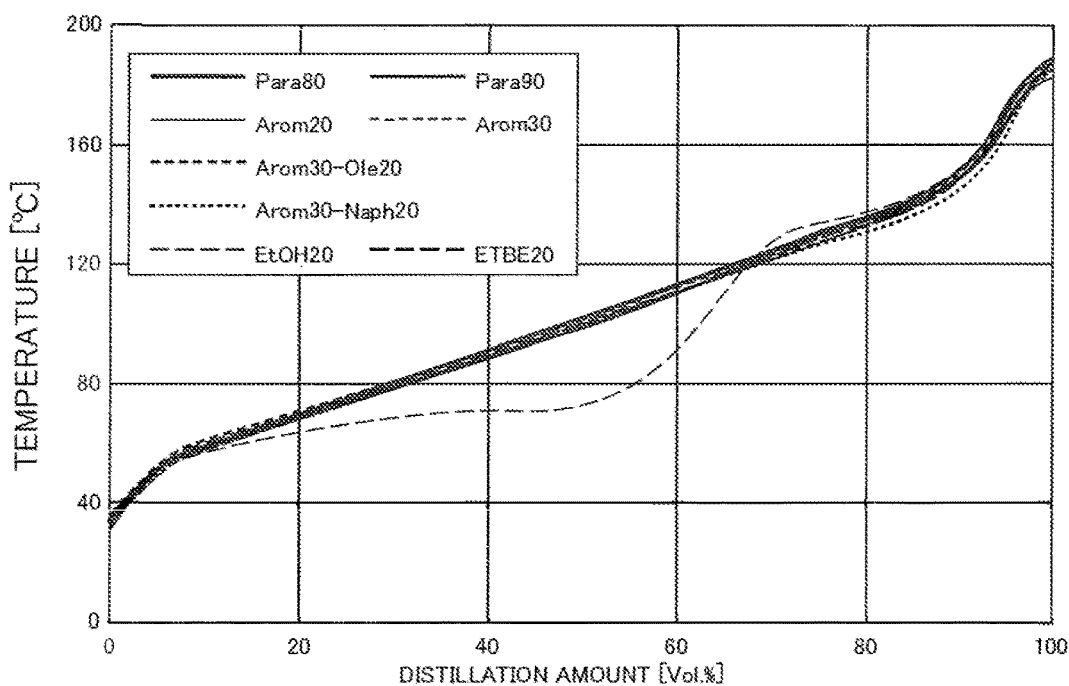
FIG. 7 is a graph illustrating distillation characteristics of each of the sample fuels.

As illustrated in FIG. 5, a plurality of sample fuels each having a substantially same octane number were prepared as fuels for use in an experiment. Specifically, seven types of sample fuels (Para90, Arom30, Arom20, Arom30-Ole20, Arom30-Naph20, ETBE20, and EtOH20), each of which had an octane number of about 90 RON, were prepared, while using RON being a commercially available gasoline standard as a reference. As illustrated in FIGS. 5 and 6, Para90 is a fuel composed only of paraffin-based hydrocarbon (normal paraffin and iso-paraffin), which is a base fuel. Arom30 is a fuel containing about 30 vol % aromatic-based hydrocarbon (where vol % is a volume fraction) in addition to paraffin-based hydrocarbon. Arom20 is a fuel containing about 20 vol % aromatic-based hydrocarbon in addition to paraffin-based hydrocarbon. Arom30-Ole20 is a fuel containing about 30 vol % aromatic-based hydrocarbon and about 20 vol % olefin-based hydrocarbon, in addition to paraffin-based hydrocarbon. Arom30-Naph20 is a fuel containing about 30 vol % aromatic-based hydrocarbon and about 20 vol % naphthene-based hydrocarbon, in addition to paraffin-based hydrocarbon. ETBE20 is a bio-based fuel containing about 20 vol % ETBE (ethyl tert-butyl ether) in addition to paraffin-based hydrocarbon. EtOH20 is a bio-based fuel containing about 20 vol % ethanol in addition to paraffin-based hydrocarbon. These seven types of sample fuels are prepared in such a way that an octane number of each of the sample fuels is about 90 RON. Further, in view of that an experimental engine is of a direct injection type, in order to prevent a difference in forming air-fuel mixture depending on fuel, sample fuels except for EtOH20 in which ethanol was mixed were prepared in such a way that kinematic viscosity, surface tension, and distillation characteristics (FIG. 7) associated with vaporization and atomization were equivalent among the sample fuels.

Further, for comparison, Para80, which is a fuel having an octane number of about 80 RON and composed only of paraffin-based hydrocarbon was also prepared, in addition to the above-described seven types of 90 RON fuels. Furthermore, although not illustrated in FIG. 5, commercially available regular gasoline and high-octane gasoline were also prepared. The octane number of regular gasoline was about 91 RON, and the octane number of high-octane gasoline was about 100 RON. Note that it can be said that the above-described seven types of 90 RON fuels and regular gasoline are fuels having an equivalent RON. On the other hand, RON of Para80 is small by about 10, and RON of high-octane gasoline is large by about 10.

(2-2) Experiment Result and Examination (a) Experiment Result

An operation by HCCI combustion was performed in a condition of four different EGR rates (0%, 40%, 60%, and 80%) with use of the above-described fuels (ten types in total). A result of the experiment is illustrated in FIGS. 8 and 9. Note that, in each case, G/F is set to 80.

Figure 8B:
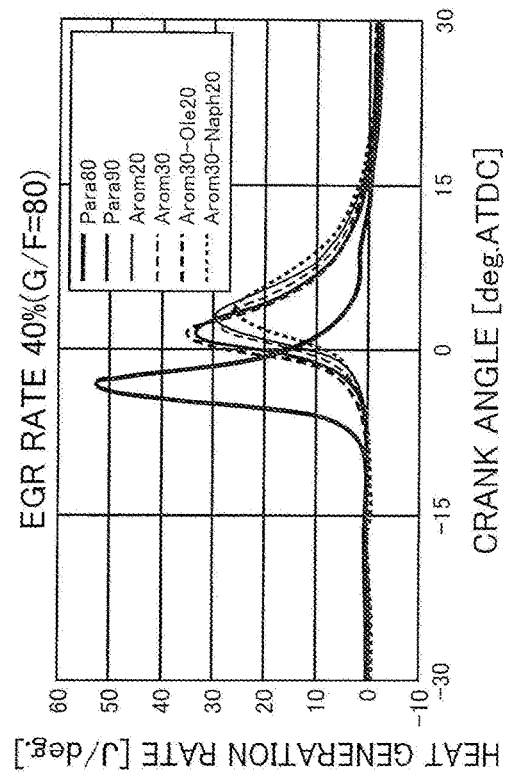
FIGS. 8(a) to 8(d) are graphs illustrating a heat generation rate for each EGR rate condition, when a plurality of types of fuels selected from among the sample fuels are respectively HCCI combusted.
Figure 8D:
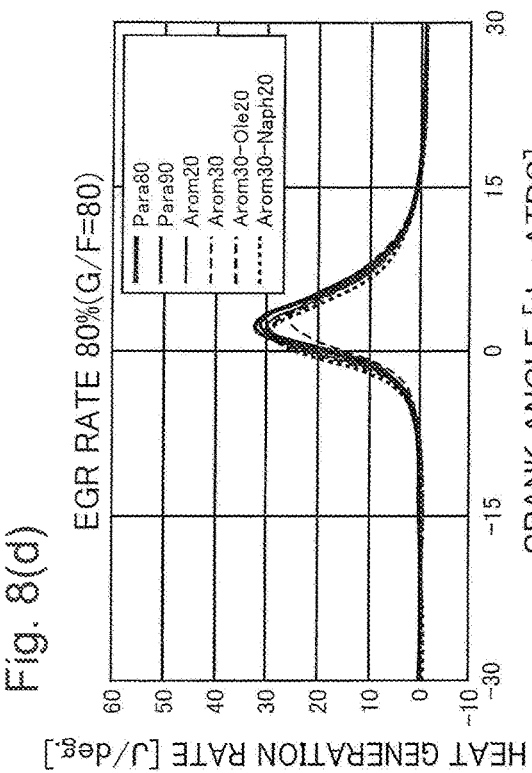
Figure 8A:
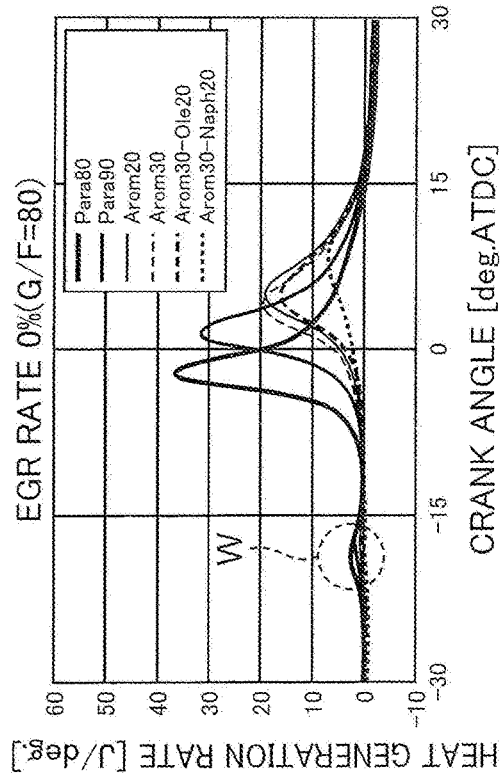
Figure 8C:
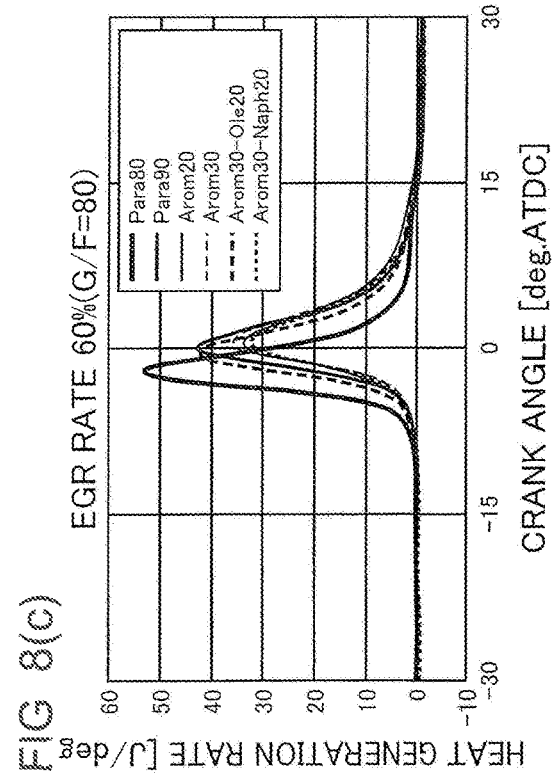

First, in order to examine an influence of each component, namely, aromatic-based component, olefin-based component, and naphthene-based component, a heat generation rate when each of the fuels, namely, Para80, Para90, Arom20, Arom30, Arom30-Ole20, and Arom30-Naph20 was used, was respectively measured, and of FIGS. 8(a) to 8(d) were acquired. FIGS. 8(a), (b), (c), and (d) of FIG. 8 illustrate cases where an EGR rate is set to 0%, 40%, 60%, and 80%. As illustrated FIG. 8(a), when an EGR rate is 0%, an ignition timing of Para80 having a small RON value is the earliest. Ignition timings of the remaining five types of fuels differ from one another, regardless that RON is substantially the same. For example, among the five types of fuels, an ignition timing of Para90 composed only of a paraffin-based component is the earliest, and an ignition timing of Arom30-Naph20 containing an aromatic-based component and a naphthene-based component is the latest. An ignition timing difference among these fuels decreases, as an EGR rate increases. When an EGR rate reaches 80% (graph (d)), an ignition timing difference by fuel is hardly recognized.

Figure 9A:
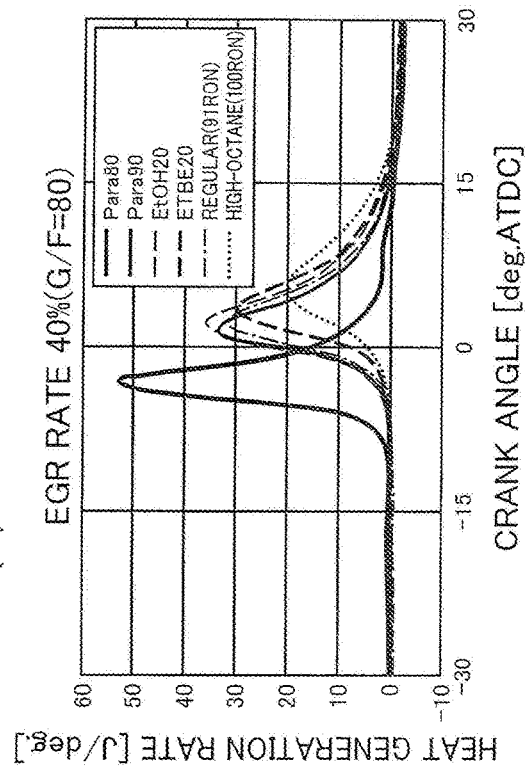
FIGS. 9(a) to 9(d) are graphs illustrating a heat generation rate for each EGR rate condition, when a plurality of others types of fuels selected from among the sample fuels are respectively HCC combusted.
Figure 9B:
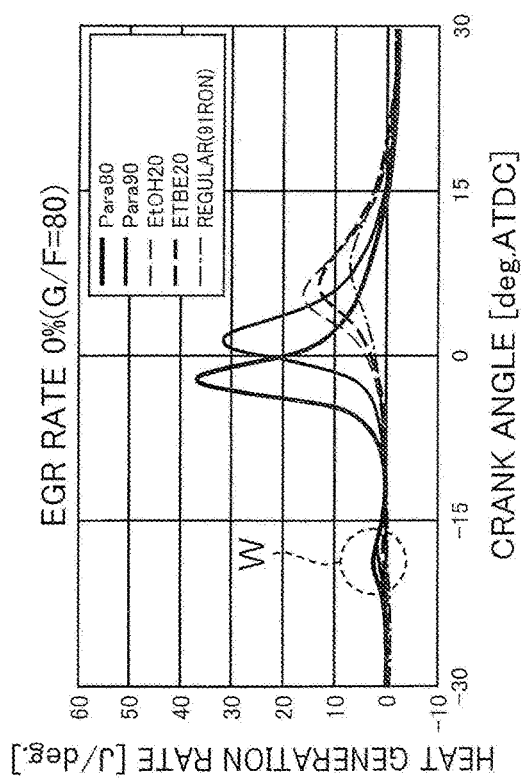
Figure 9C:
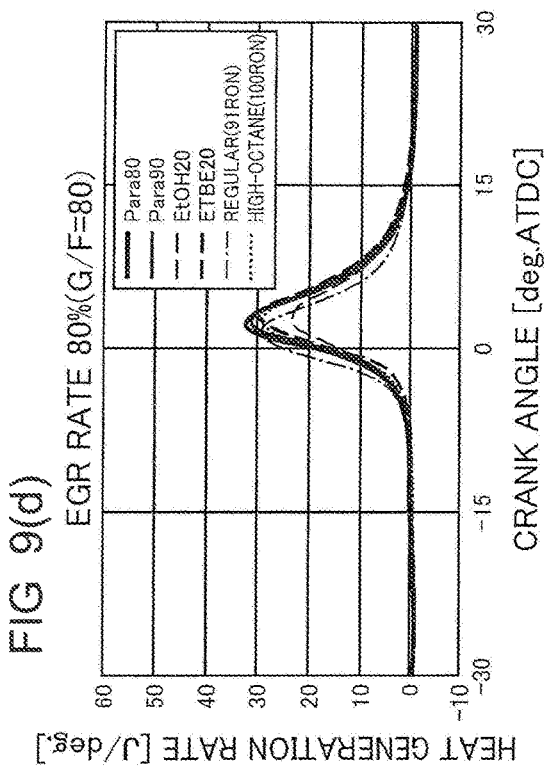
Figure 9D:
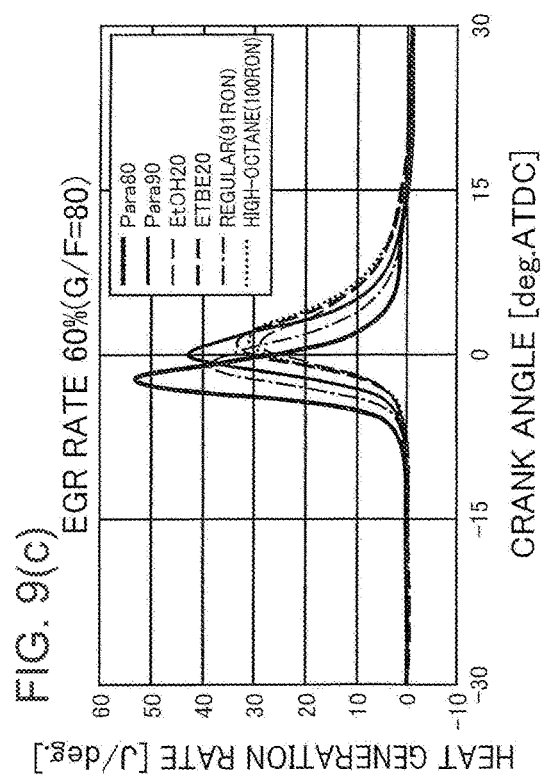

Next, in order to examine an influence of a representative component contained in a bio-based fuel, and an influence of a component or an octane number of commercially available gasoline, a heat generation rate when each fuel, namely, EtOH20, ETBE20, regular gasoline (91 RON), and high-octane gasoline (100 RON) was used, was respectively measured, and FIGS. 9(a) to 9(d) were acquired. FIGS. 9(a), (b), (c), and (d) respectively illustrate cases where an EGR rate is set to 0%, 40%, 60%, and 80%. For comparison, each graph also illustrates a heat generation rate when Para80 and Para90 were used. As illustrated in FIG. 9(a), when an EGR rate is 0%, high-octane gasoline fails to be ignited due to lack of cylinder temperature. Further, regular gasoline also exhibited characteristics such that ignition is less likely to occur, and an ignition timing thereof is remarkably retarded. When an EGR rate is 40% (FIG. 9(b)), even high-octane gasoline can be ignited, and an ignition timing of regular gasoline becomes substantially coincident with an ignition timing of Para90. Further, similarly to the case of FIGS. 8(a) to 8(d), when an EGR rate reaches 80% FIG. 9(d)), an ignition timing difference by fuel is hardly recognized.

Figure 10A:
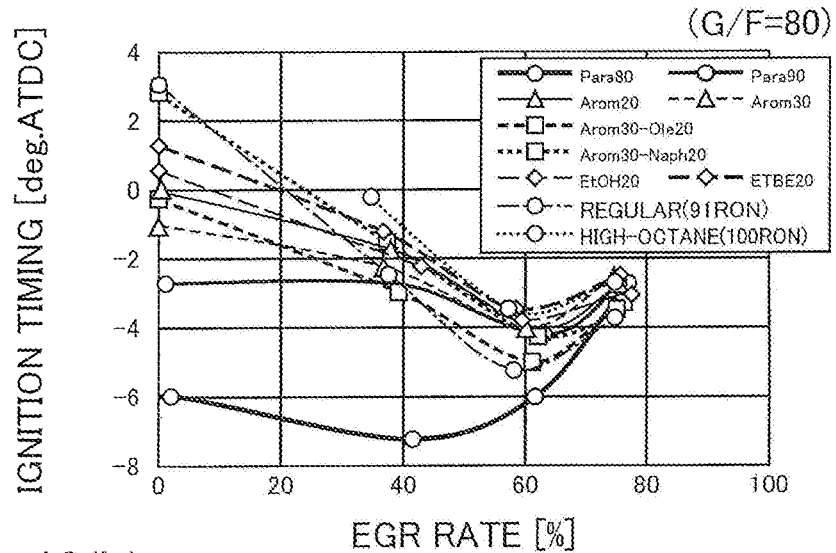
FIGS. 10(a) to 10(c) are graphs illustrating an ignition timing, indicated specific fuel consumption (ISFC), and a change rate of indicated mean effective pressure (IMEP) of each fuel acquired from combustion tests in FIGS. 8 and 9, in relation to an EGR rate.
Figure 10B:
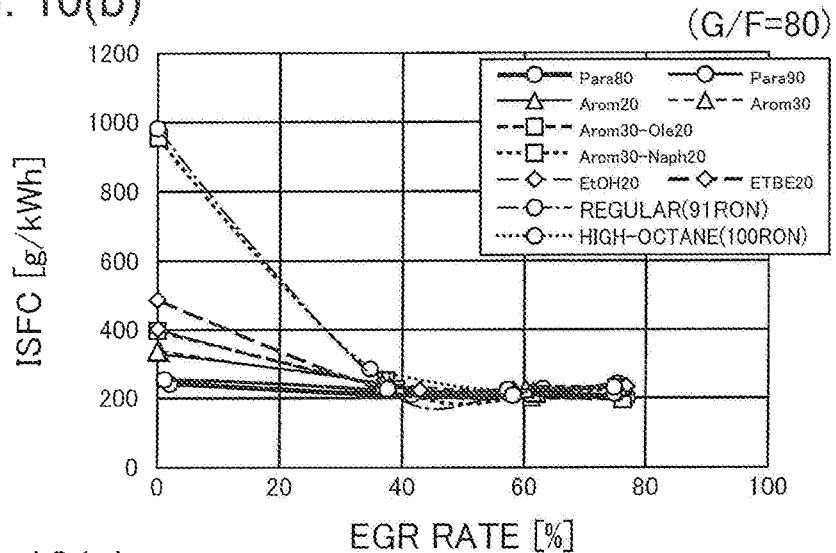
Figure 10C:
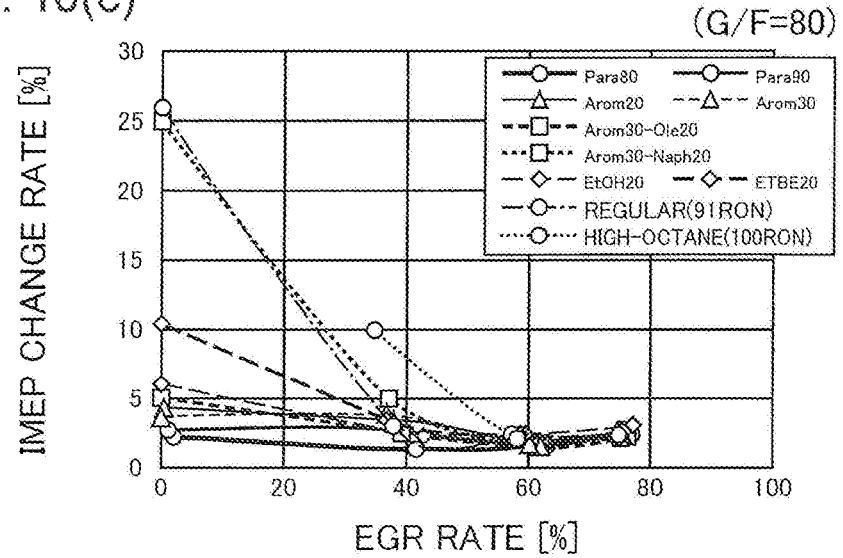

Ignition timings of all ten types of fuels used in the experiment, indicated specific fuel consumption (ISFC), and a change rate of indicated mean effective pressure (IMEP) were examined in relation to an EGR rate, based on a result of the above-described combustion test (FIGS. 8(a) to 8(d) and 9(a) to 9(d)), and FIGS. 10(a) to 10(c) were respectively acquired. As already described, in a condition that an EGR rate is 0%, high-octane gasoline (100 RON) fails to be ignited. Therefore, lines associated with high-octane gasoline in FIGS. 10(a) to (c) are missing in a range in which an EGR rate is lower than 40% (strictly speaking, a range in which an EGR rate is lower than about 35%).

As illustrated in FIG. 10(a), in a condition that an EGR rate is 0%, an ignition timing differs by about 9 deg maximally among the nine types of fuels except for unignitable high-octane gasoline. As illustrated in FIG. 8(a) and FIG. 9(a), it is conceived that such a large ignition timing variation occurs due to a low-temperature oxidation reaction during a compression stroke (see a portion indicated by the symbol W surrounded by a broken line). Note that a low-temperature oxidation reaction is a slow oxidation reaction that occurs in a relatively low-temperature condition before occurrence of a high-temperature oxidation reaction, which is a reaction such that fuel vigorously oxidizes (reaction accompanying generation of flame). Since a low-temperature oxidation reaction is a slow reaction such that a molecular structure of fuel is gradually destroyed, a low-temperature oxidation reaction is likely to be affected by a difference in fuel component (molecular structure). It is conceived that occurrence of such a low-temperature oxidation reaction beforehand may affect a high-temperature oxidation reaction, and cause a large ignition timing difference.

Further, in comparison among the seven types of fuels, each of which has an octane number of about 90 RON (para90, Arom30, Arom20, Arom30-Ole20, Arom30-Naph20, ETBE20, and EtOH20), although ignition timings differ by about 6 deg maximally in a condition that an EGR rate is 0%, when an EGR rate is raised up to 40%, ignition timings are advanced as a whole, and an ignition timing difference falls within about 2 deg. In other words, it is clear that by setting an EGR rate to 40% or more among the seven types of fuels having the same RON value, it is possible to substantially eliminate an influence of a difference in fuel component on an ignition timing. It is conceived that this is because a low-temperature oxidation reaction is sufficiently suppressed by an influence of a high temperature state within a cylinder by internal EGR.

In comparison among all fuels including Para80, regular gasoline, and high-octane gasoline in addition to the seven types of fuels, namely, among the ten types of fuels whose octane numbers are different from one another from 80 RON to 100 RON, although ignition timings differ by about 7 deg maximally in a condition that an EGR rate is 40%, when an EGR rate is raised up to 60%, am ignition timing difference falls within about 3 deg, and when an EGR rate is raised up to 80%, an ignition timing difference falls within about 2 deg. In other words, it is clear that by setting an EGR rate to 80% or more among the ten types of fuels having different RON values, it is possible to substantially eliminate an influence of a difference in fuel component on an ignition timing. Note that, when an EGR rate is raised from 60% to 80%, ignition timings are retarded as a whole. This is because a specific heat ratio of gas within a cylinder is lowered accompanied by an increase in EGR rate, and a compression end temperature is lowered.

Further, ISFC and an IMEP change rate FIGS. 10(b) and 10(c)) are similar to a change in ignition timing. That is, when an EGR rate is equal to or higher than 60%, an influence by a fuel component and RON is hardly recognized.

(b) Influence by G/F

In order to clarify an influence due to a difference in G/F, an operation by HCCI combustion was performed in various G/F conditions by using seven types of fuels (Para90, Arom30, Arom20, Arom30-Ole20, Arom30-Naph20, ETBE20, and EtOH20), each of which had an octane number of about 90 RON. Then, an ignition timing difference ($\Delta$Ig) with use of Para90 as a reference was examined, and an isoline graph illustrated in FIG. 11 was acquired. Note that, since a supply amount of fuel into a cylinder increases, as G/F decreases, small G/F means high engine load, and large G/F means low engine load. Further, in a condition that an EGR rate is 80, when G/F reached 80, an excess air factor $\lambda$ reached 1. Therefore, the engine could not be operated on a high load side than the load corresponding to G/F=80. In view of the above, in FIG. 11, an operation disable region (a region indicated as "Over Rich") where $\lambda$ is smaller than 1 is illustrated blank. This definition is also applied to the graphs of FIGS. 12, 14, and 15 to be described later.

Figure 11:
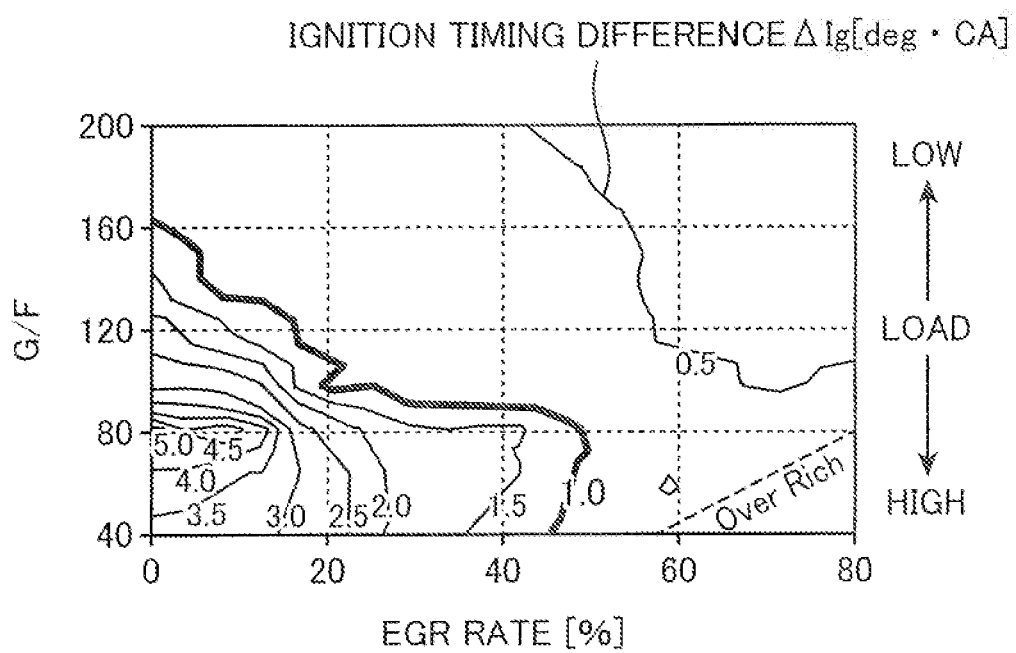
FIG. 11 is an isoline graph illustrating how an ignition timing difference among 90 RON fuels changes depending on G/F and an EGR rate.

As illustrated in FIG. 11, in a low load operating condition where G/F is equal to or larger than 160, an ignition timing difference lies within ±1 deg without depending on an EGR rate. It is clear that an influence due to a difference in fuel component is small. However, when G/F becomes smaller than 160 (in other words, load increases), a region where an ignition timing difference becomes larger than ±1 deg (in other words, a region where an influence due to a difference in fuel component is large) starts to appear. As is understood from an isoline representing that an ignition timing difference is "1.0", in order to suppress an ignition timing difference within ±1 deg, it is necessary to set an EGR rate to 20% or more in a condition that G/F is 100, and it is necessary to set an EGR rate to 40% or more in a condition that G/F is 80 or less.

Figure 12:
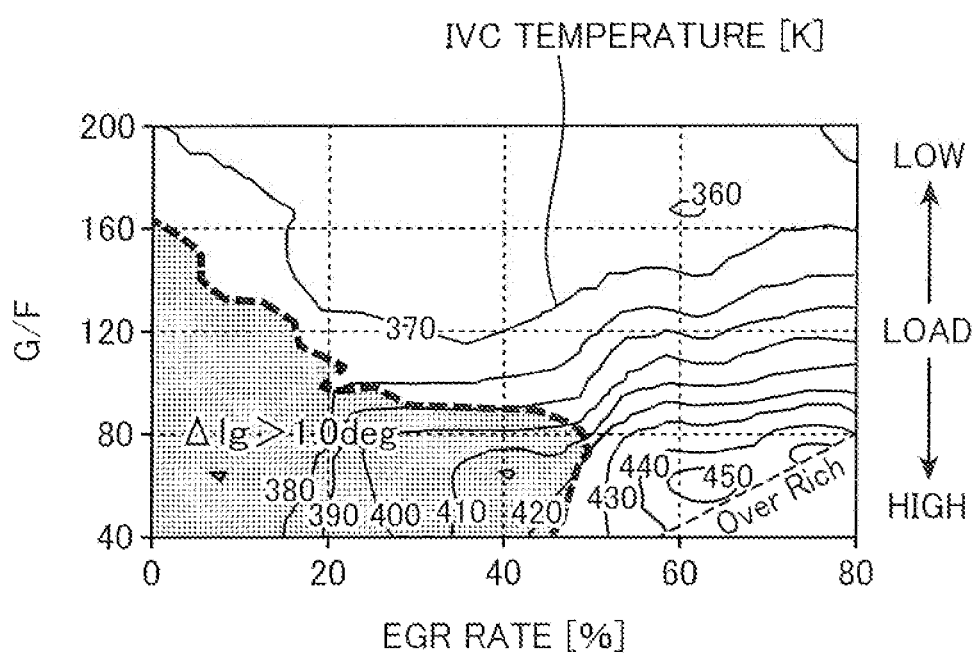
FIG. 12 is a graph illustrating that an isoline of an IVC temperature that changes depending on G/F and an EGR rate overlaps the result of FIG. 11.

In order to comprehend a mechanism by which characteristics as illustrated in FIG. 11 appear, a cylinder temperature at an intake valve close timing (IVC) was examined, and an isoline graph illustrated in FIG. 12 was acquired. Note that the graph of FIG. 12 also illustrates an isoline representing that an ignition timing difference is ±1 deg, which is acquired from FIG. 11. As illustrated in FIG. 12, it is clear that an operating condition in which an ignition timing difference ($\Delta$Ig) becomes larger than ±1 deg is an operating condition in which G/F is small (in other words, a fuel concentration is high), and a cylinder temperature is low. This implies that an ignition timing difference is generated by an influence of a low-temperature oxidation reaction.

(c) Influence by Fuel Property

In order to examine an influence of a fuel property (an octane number and a component) on an ignition timing of HCCI combustion, an analysis using an octane index (OI) was performed. Specifically, by identifying a coefficient K illustrated in the following formula (1) for each operating condition, a degree of dependence of an ignition timing on RON and MON was examined.

$$OI=(1-K)\times RON+K\times MON \tag{1}$$

As is well-known, RON denotes a research octane number, and MON denotes a motor octane number.

Both of the octane numbers are indexes each indicating ignitability (antiknock property) of fuel, and they are different in terms of measurement conditions. Due to the measurement condition difference, it can be said that RON is an index representing ignitability in a relatively low temperature condition, and MON is an index representing ignitability in a relatively high temperature condition. More specifically, RON is an index representing fuel ignitability in a combustion condition accompanying a low-temperature oxidation reaction, and MON is an index representing fuel ignitability in a combustion condition without accompanying a low-temperature oxidation reaction.

A coefficient K in the above-described Eq. (1) was identified by a least square method for each EGR rate, based on a change in ignition timing of each fuel illustrated in FIG. 10(a), specifically, a change in ignition timing of each fuel, when G/F was fixed to 80 and an EGR rate was changed. Thus, the graph of FIG. 13 was acquired. Herein, identifying a coefficient K for each operating condition means examining which one of RON and MON has a higher correlation to an ignition timing for each operating condition. Specifically, when K identified in a certain operating condition is large, it can be said that the operating condition is an operating condition in which an ignition timing is likely to be affected by a MON value (in other words, a correlation between an ignition timing and MON is high). This means that the operating condition is an operating condition in which an influence of a low-temperature oxidation reaction is small. On the other hand, when K identified in a certain operating condition is small, it can be said that the operating condition is an operating condition in which an ignition timing is likely to be affected by an RON value (in other words, a correlation between an ignition timing and RON is high). This means that the operating condition is an operating condition in which an influence of a low-temperature oxidation reaction is large. Note that, when the coefficient K is 1, since Eq. (1) becomes OI=MON, an octane index is MON itself. Further, when the coefficient K is 0, since Eq. (1) becomes OI=MON, an octane index is RON itself.

Figure 13:
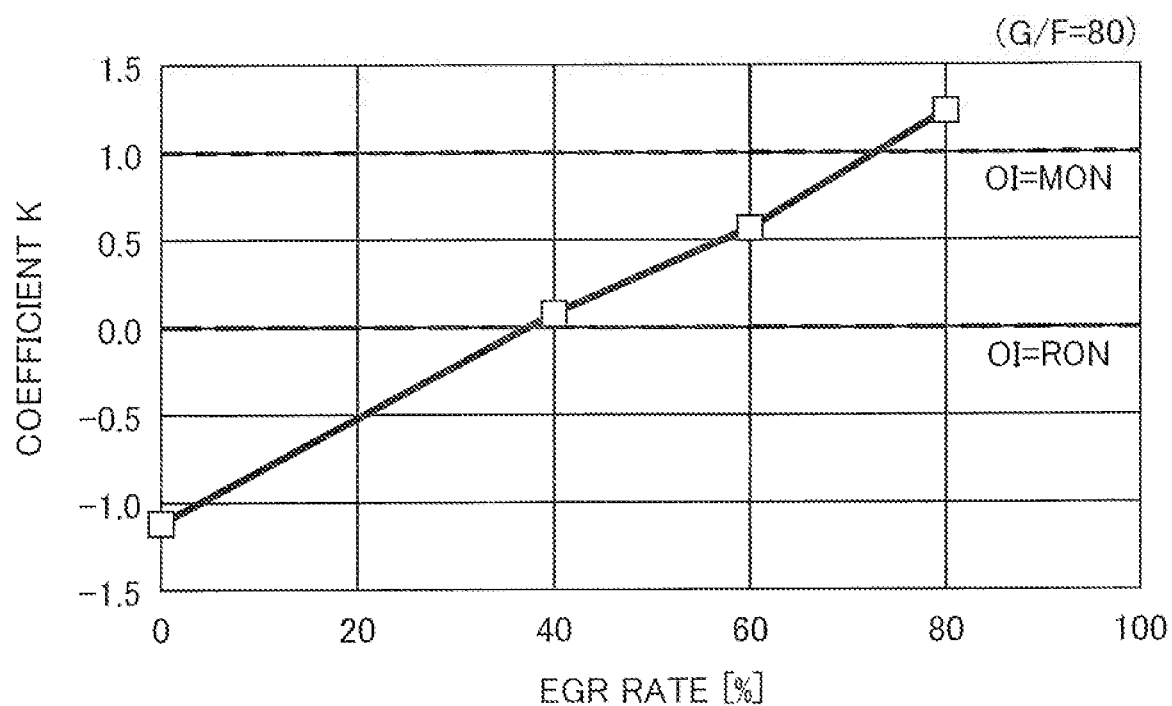
FIG. 13 is a graph illustrating a coefficient K of an octane index in relation to an EGR rate.

FIG. 13 illustrates that a coefficient K is larger than 1 in a condition that an EGR rate is 80%; a coefficient K is substantially equal to zero in a condition that an EGR rate is 40%; and a coefficient K decreases proportionally, as an EGR rate decreases. This implies that an influence of a low-temperature oxidation reaction is negligible in a condition that an EGR rate is 80%, and an influence of a low-temperature oxidation reaction gradually increases, as an EGR rate becomes lower than 80%. In other words, a change in coefficient K illustrated in FIG. 13 well describes characteristics, namely, how a fuel property affects an ignition timing. Note that, in FIG. 11, an ignition timing difference is about 1±deg or less in almost all G/F cases in a range in which an EGR rate is 40% or more. The above insight and the result of FIG. 13 reveal that the coefficient K is required to be 0 or more in order to sufficiently suppress an influence of a fuel property in HCCI combustion. Conversely, when the coefficient K is smaller than 0, an influence of a low-temperature oxidation reaction significantly increases, and an ignition timing of HCCI combustion may greatly vary due to a difference in fuel property. Therefore, in order to perform appropriate HCCI combustion while avoiding such a phenomenon, it is important to use an operating condition in which a coefficient K of an octane index becomes 0 or more, in other words, an operating condition in which an influence of a low-temperature oxidation reaction is relatively small.

(2-3) Guideline Study on HCCI Combustion Control (a) Study on Various Operation Constraints It is known that, when HCCI combustion is performed, a number of constraints to be considered is large, as compared with conventional SI combustion (spark ignition combustion). For example, large combustion noise may occur when sharp combustion progresses in a high load range of an engine. Further, in a low load range, combustion may be unstable due to a low temperature of internal EGR gas as a heat source for ignition. Specifically, there is a constraint on HCCI combustion such that combustion has to be controlled in such a way as to solve the issues, namely, an increase in combustion noise in a high load range, and lowering of combustion stability in a low load range. In view of the above, a guideline on combustion control for minimizing an influence by a fuel property was studied, taking into consideration the above constraint.

Figure 14A:
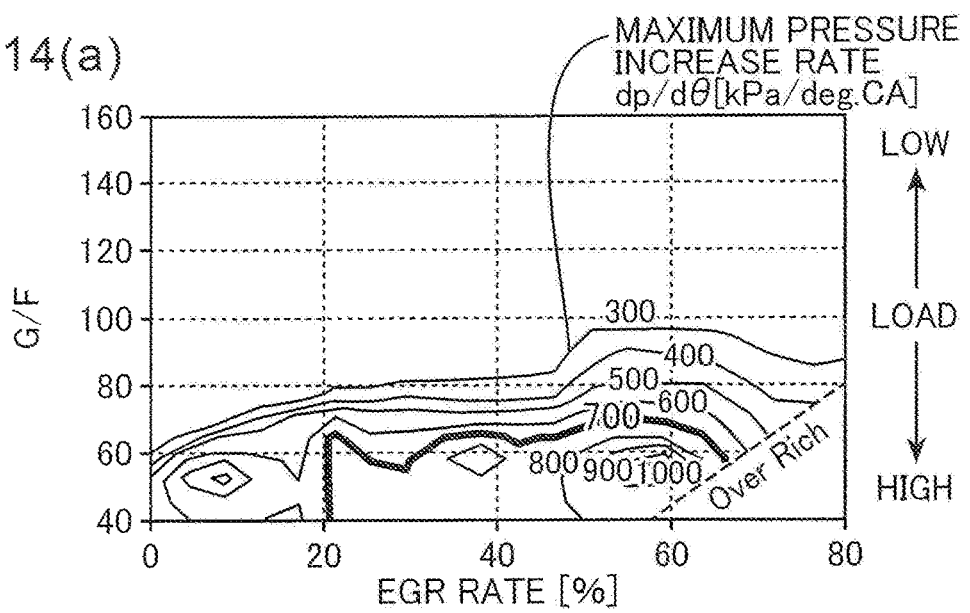
FIGS. 14(a) to 14(c) are isoline graphs of a maximum pressure increase rate (dp/dθ), an IMEP change amount (SDI), and a coefficient K of an octane index acquired from a combustion test using regular gasoline.
Figure 14B:
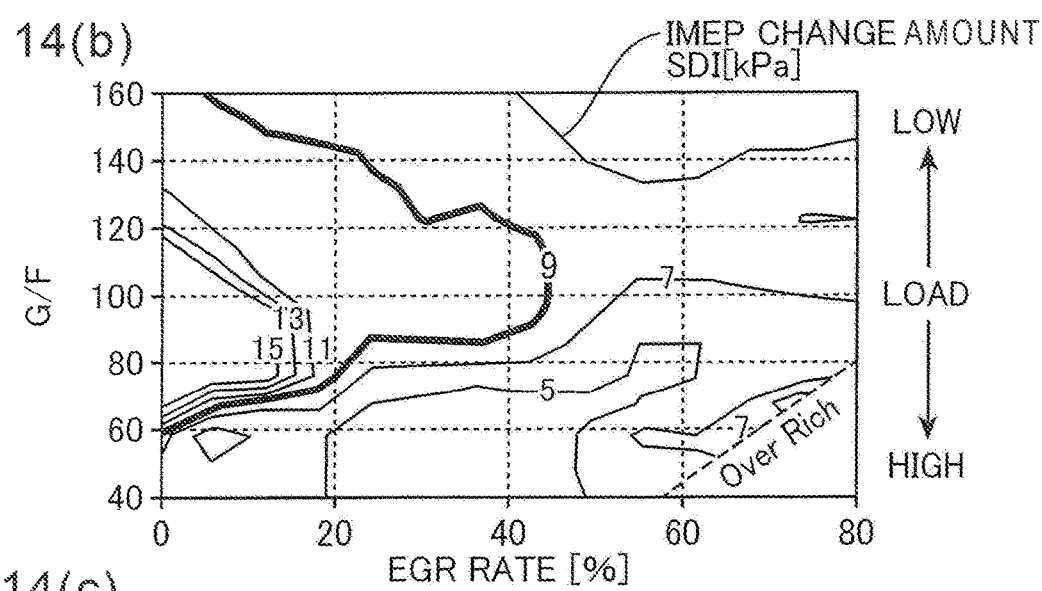

Combustion noise and combustion stability when HCCI combustion was performed by using regular gasoline (91 RON) was examined, and FIGS. 14(a) and 14(b) were acquired. Specifically, FIG. 14(a) is an isoline graph indicating a change in maximum pressure increase rate (dp/dθ) depending on an EGR rate and G/F, and FIG. 14(b) is an isoline graph indicating a change in IMEP change amount (SDI) depending on an EGR rate and G/F. Further, as FIG. 14(c) an isoline graph indicating a change in coefficient K of an octane index depending on an EGR rate and G/F was prepared. Note that a maximum pressure increase rate (dp/dθ) is a maximum value of an increase rate of a cylinder pressure that changes depending on a crank angle, and is a parameter serving as an index of combustion noise. Further, an IMEP change amount (SDI) is a maximum value of an IMEP change amount, which changes for each combustion cycle, in other words, a torque change amount for each combustion cycle, and is a parameter serving as an index for combustion stability.

In terms of suppressing noise and securing combustion stability, while weakening an influence by a fuel property, herein, it is assumed that an upper limit of a maximum pressure increase rate is 700 kPa/deg (corresponding to 5 MPa/sec), an upper limit of an IMEP change amount is 9 kPa, and a lower limit of a coefficient K is 0. As illustrated in the graph (a), although the maximum pressure increase rate exceeds the upper limit (700 kPa/deg) in a part of a region on a high load side, since an ignition timing is retarded when an EGR rate is low, the maximum pressure increase rate is suppressed to the upper limit or lower in any of load ranges where an EGR rate is low (lower than about 20%). As illustrated in the graph (b), although the IMEP change amount exceeds the upper limit (9 kPa) in a part of a region where an EGR rate is low, since both of a temperature of combustion gas and a fuel concentration are increased when a load is high, the IMEP change amount is suppressed to the lower limit or lower, even in a condition that an EGR rate is low (or without EGR) on a high load side. As illustrated in the graph (c), the coefficient K falls below the lower limit (0) in a part of a region where the EGR rate is low and the load is high. This is because when the EGR rate is low and the load is high, high-concentration fuel is present in a low-temperature cylinder, and combustion is likely to be affected by a low-temperature oxidation reaction.

(b) Combustion Control Guideline Considering Various Operation Constraints

Figure 14C:
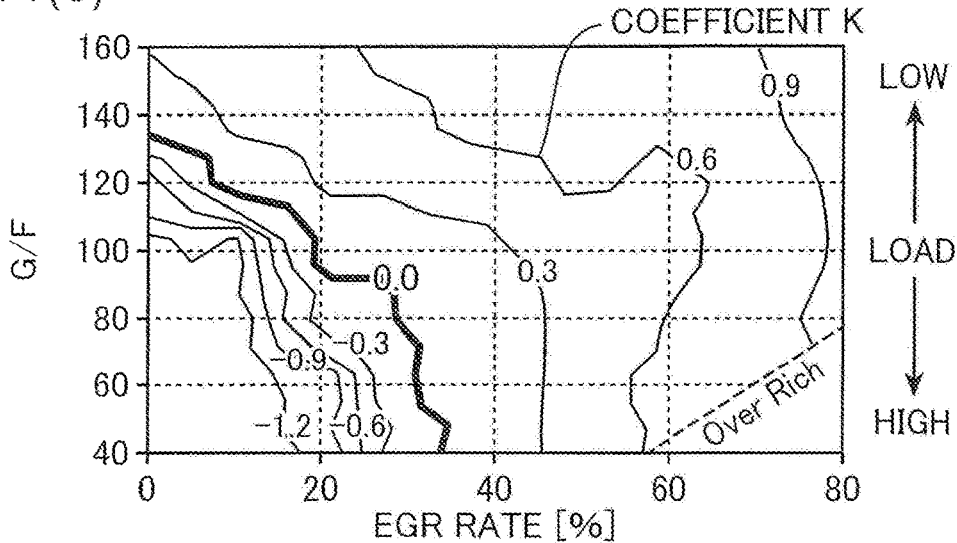
Figure 15:
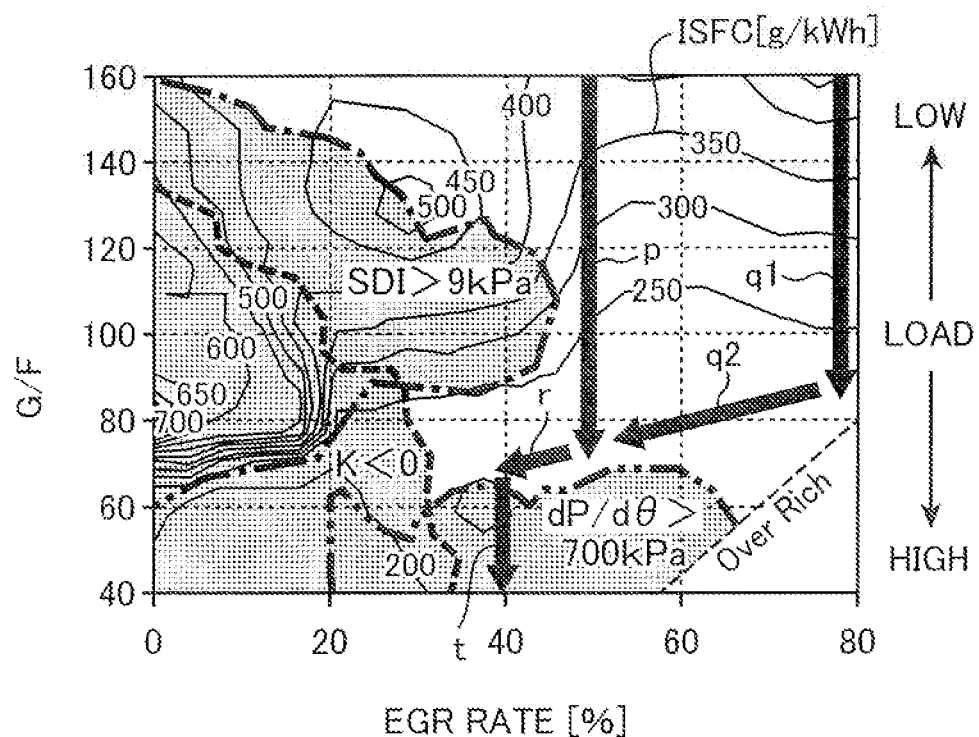
FIG. 15 is a graph illustrating that an isoline of indicated specific fuel consumption (ISFC) overlaps the result of FIG. 14, and is a diagram for describing a control guideline for performing appropriate HCCI combustion.

The graph of FIG. 15 was acquired by overlapping an allowable value of each of the maximum pressure increase rate (dp/dθ), the IMEP change amount (SDI), and the coefficient K illustrated in FIGS. 14(a) to 14(c) on an isoline of indicated specific fuel consumption (ISFC). A control guideline for performing appropriate HCCI combustion from a low load to a high load, while avoiding an increase in combustion noise and lowering of combustion stability is studied by using the graph of FIG. 15. Note that FIG. 15 illustrates a region where each of a maximum pressure increase rate, an IMEP change amount, and a coefficient K falls outside an allowable range, in other words, a region where dp/dθ>700 kPa, a region where SDI>9 kPa, and a region where k<0 respectively in gray. Hereinafter, these regions are referred to as NG regions.

Herein, each of NG regions on a maximum pressure increase rate (dp/dθ) and an IMEP change amount (SDI) corresponds to a case where regular gasoline is used. As already described, it is clear that, as far as an octane number is equivalent, similar ignition characteristics are acquired, even when fuel having a different fuel property is used, by generating an operating condition in which the coefficient K becomes 0 or more. Therefore, it is conceived that, as far as an octane number of fuel is guaranteed to be equivalent to that of regular gasoline (91 RON), low-noise and stable HCCI combustion can be performed without depending on a fuel property by adjusting an operating condition in such a way that NG regions on a maximum pressure increase rate, an IMEP change amount, and a coefficient K are avoided.

In view of the above, a combustion control guideline in a case where an octane number of fuel is guaranteed to be equivalent to that of regular gasoline is studied. In this case, it is proposed to control an EGR rate along arrows p, r, and t illustrated in FIG. 15. Specifically, first, as illustrated by the arrow p, an EGR rate is uniformly set to 50% in a region where load is low as compared with the NG region on the maximum pressure increase rate (a region where dp/dθ>700 kPa). As illustrated by the arrow r, when the load approaches a value corresponding to a boundary of the NG region on the maximum pressure increase rate, the load is increased, while decreasing an EGR rate along a boundary of the NG region on the maximum pressure increase rate. When the EGR rate approaches a value corresponding to a boundary of the NG region on the coefficient K, as illustrated by the arrow t, the load is increased, while maintaining the EGR rate to a fixed value (40%) so as not to increase the EGR rate any more. Since the arrows p and r are deviated from the NG regions on the maximum pressure increase rate, the IMEP change amount, and the coefficient K, it is conceived that low-noise and stable HCCI combustion can be performed without depending on a fuel property by controlling an EGR rate along the arrows p and r. On the other hand, since the arrow t is present within the NG region on the pressure increase rate, it is necessary to provide another measure for suppressing combustion noise. For example, a measure such that an ignition timing is intentionally retarded by retarding a fuel injection timing as compared with a normal injection operation may be provided.

Next, a combustion control guideline in a case where an octane number of fuel is not guaranteed to be equivalent to that of regular gasoline is studied. In this case, it is proposed to control an EGR rate along arrows q1, q2, r, and t illustrated in FIG. 15. Specifically, as illustrated by the arrow q1, in a region where load is low as compared with an operation disable region where λ is smaller than 1 (a region indicated as "Over Rich"), an EGR rate is uniformly set to 80%. In FIG. 10(a), even when RON is changed from 80 to 100, as far as an EGR rate is 80%, it is possible to suppress an ignition timing variation within 2 deg. In view of the above, in a load range where λ is 1 or more (G/F is about 80 or more), an ignition timing variation is suppressed by setting an EGR rate to 80%. As illustrated by the arrow q2, when λ approaches 1, the load is increased, while decreasing an EGR rate. Thereafter, similarly to a case where an octane number of fuel is guaranteed, the load is increased, while decreasing an EGR rate along the arrow r, and the load is increased, while fixing an EGR rate along the arrow t.

(3) Description on Operations and Advantageous Effects of Embodiment

Next, operations and advantageous effects of the embodiment described with reference to FIGS. 1 to 3 are described, based on the above-described result on a study by the inventors of the present application, In the embodiment, as illustrated in FIGS. 2 and 3, when it is determined that fuel having a prescribed octane number (an octane number equivalent to that of regular gasoline) is used, internal EGR control is performed along a target EGR rate defined in the map A (graph (a) of FIG. 3); and when it is determined that fuel having a prescribed octane number is not used, internal EGR control is performed along a target EGR rate defined in the map B (graph (b) of FIG. 3). Selectively using a map (EGR rate) based on octane number determination as described above can be regarded as control that conforms to a control guideline of FIG. 15, which was acquired by the above-described study. Specifically, the zones P, R, and T in the map A of graph (a) of FIG. 3 correspond to setting an EGR rate along the arrows p, r, and t in FIG. 15, and the zones Q1, Q2, R, and T in the map B of graph (b) of FIG. 3 correspond to setting an EGR rate along the arrows q1, q2, r, and t in FIG. 15. The embodiment in which an EGR rate is set in the above-described manner is advantageous in performing stable HCCI combustion, regardless of whether an octane number is a prescribed octane number.

Specifically, in the embodiment, in a load range from a lowest load Y to a second load X2, in a case where the octane number is determined not to be a prescribed octane number (the map B), an EGR rate is set large, as compared with a case where the octane number is determined to be a prescribed octane number (the map A). Therefore, an environment such that a low-temperature oxidation reaction does not occur (or is less likely to occur) is created by raising the temperature of the cylinder 2 by a large amount of internal EGR. Consequently, it is possible to sufficiently suppress an influence of a difference in fuel property (an octane number and a component) on an ignition timing. Thus, even if fuel having a different octane number is used, it is possible to avoid an ignition timing from greatly varying, and it is possible to perform stable HCCI combustion. Further, since an EGR rate is set relatively low in a case where fuel has a prescribed octane number, it is possible to avoid an excessively large amount of EGR gas from being introduced into the cylinder 2, and it is possible to stabilize HCCI combustion, while introducing an appropriate amount of EGR gas, in a condition that an ignition timing variation is expected to be suppressed without bringing the cylinder 2 to a sufficiently high temperature state in view of that the octane number is equivalent.

Further, in the embodiment, as described with reference to the flowchart of FIG. 2, it is determined whether fuel having a prescribed octane number is used, based on a fuel ignition timing to be specified by using the cylinder pressure sensor SN3 in a predetermined operating condition. Therefore, it is not necessary to use an expensive sensor for directly measuring an octane number of fuel, for example, and it is possible to reduce an addition cost required for determining an octane number.

Further, in the embodiment, by setting an EGR rate to a value as illustrated in the maps A and B (graphs (a) and (b) of FIG. 3) in a load range from a lowest load Y to a third load X3, it is possible to suppress each of a coefficient K of an octane index, a maximum pressure increase rate (dp/dθ), and an IMEP change amount (SDI) within an allowable range, as illustrated by the arrows p, q1, q2, and r in the graph of FIG. 15. Thus, it is possible to suppress an ignition timing variation due to a difference in fuel property (an octane number and a component), an increase in combustion noise, and lowering of combustion stability; and it is possible to perform low-noise and stable HCCI combustion without depending on a fuel property.

Figure 16:
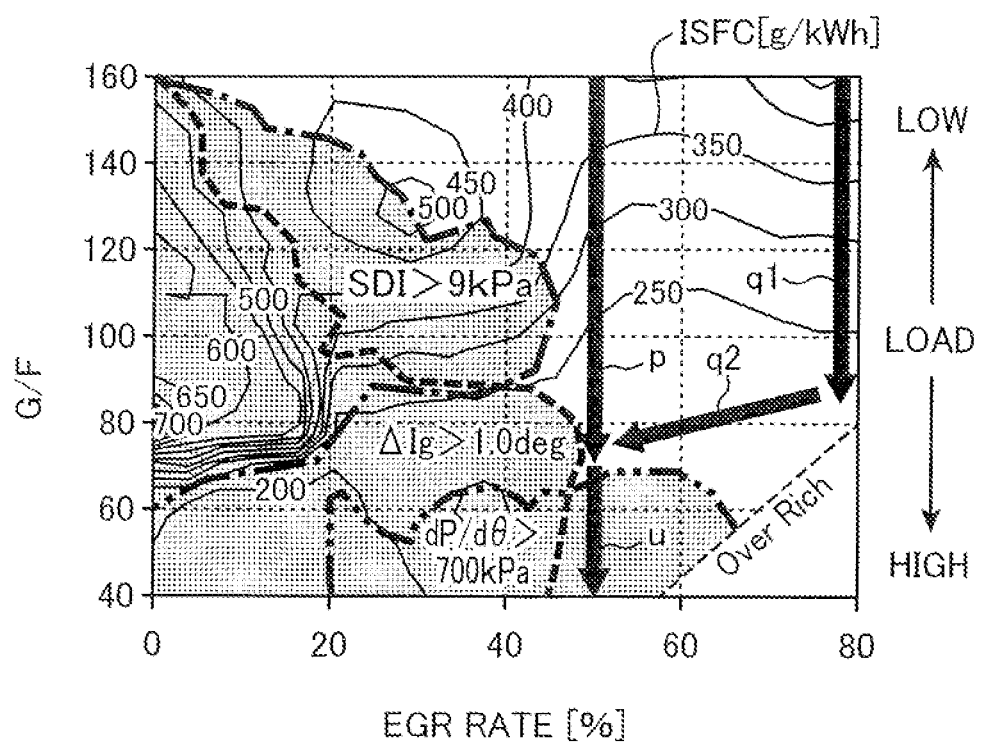
FIG. 16 is a diagram corresponding to FIG. 15 for describing a modification of the embodiment.

In the embodiment, an EGR rate is set in such a way that a coefficient K of an octane index is set to be equal to or larger than 0 in all load ranges of the engine. Alternatively, as illustrated by arrows p, q1, q2, and u in FIG. 16, an EGR rate may be set in such a way that an ignition timing difference (ΔIg) avoids a region exceeding ±1 deg. In this configuration, since ΔIg is suppressed to be equal to or lower than ±1 deg, it is also possible to suppress an ignition timing variation due to a difference in fuel component. Note that a boundary of an NG region (ΔIg>1.0 deg) on an ignition timing difference in FIG. 16 is acquired by overlapping an isoline representing that ΔIg=1.0, which is illustrated in FIG. 11.

Figure 17:
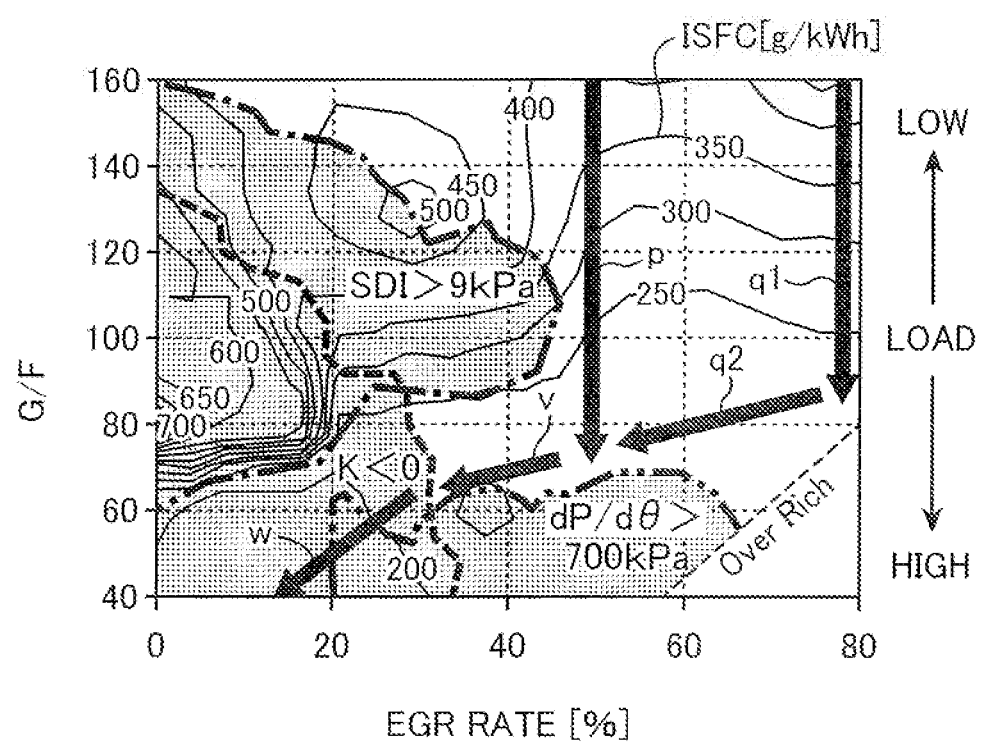
FIG. 17 is a diagram corresponding to FIG. 15 for describing another modification of the embodiment.

Further, in the embodiment, as illustrated by the arrow r in FIG. 15, the load is increased, while decreasing an EGR rate along a boundary of an NG region on a maximum pressure increase rate, and after the condition approaches a condition in which a coefficient K of an octane index becomes 0, as illustrated by the arrow t, the load is increased, while fixing the EGR rate. Alternatively, an EGR rate may be controlled by a pattern as illustrated by arrows v and w in FIG. 17. Specifically, in the example of FIG. 17, also after an EGR rate that is decreased by a constraint on a maximum pressure increase rate reaches an NG region on a coefficient K as illustrated by the arrow v, the EGR rate is continued to decrease, as the load increases, as illustrated by the arrow w. In this case, an ignition timing variation may increase due to a difference in fuel property at the position of the arrow w. However, for example, by performing feed-forward processing with respect to a predetermined control amount, while detecting a combustion state with high accuracy, an ignition timing variation may be eliminated, even when the EGR rate is set as illustrated by the arrow w.

Further, in the embodiment, internal EGR is performed by opening the exhaust valve 12 in an intake stroke (accompanied with this operation, burnt gas is caused to flow back into the cylinder 2). Alternatively, internal EGR may be performed by providing a negative overlap period during which both of an intake valve and an exhaust valve are closed. Further alternatively, in place of internal EGR, external EGR of refluxing burnt gas through an EGR passage connecting an intake passage and an exhaust passage by a short distance may be performed. In this case, however, an EGR cooler for cooling burnt gas is not disposed in an EGR passage. This is proposed in order to reflux burnt gas (exhaust gas) discharged from a cylinder 2 to the cylinder 2 in a high temperature state through a short-distance EGR passage in which an EGR cooler is not disposed. In any case, as far as EGR (high-temperature EGR) of introducing burnt gas into a cylinder in a high temperature state is performed, various modifications are applicable to an EGR device of the present invention.

(4) Overview of Embodiment

The following is an overview of the embodiment.

A compression ignition gasoline engine according to the embodiment includes: a cylinder for accommodating a piston to be reciprocally movable; a fuel injection valve for injecting fuel containing gasoline as a main component into the cylinder; an EGR device operative to perform high-temperature EGR of introducing burnt gas generated in the cylinder into the cylinder at a high temperature; an octane number determination unit for determining whether fuel injected from the fuel injection valve has a prescribed octane number; and a combustion control unit for controlling the fuel injection valve and the EGR device in such a way that HCCI combustion in which fuel injected from the fuel injection valve self-ignites within the cylinder occurs. The combustion control unit controls the EGR device in such a way that, in at least a partial load operating range in which HCCI combustion is performed, an EGR rate increases, as compared with a case where fuel is determined to have a prescribed octane number, when the octane number determination unit determines that fuel does not have a prescribed octane number.

According to this configuration, when the fuel is determined not to have the prescribed octane number, the EGR rate is set large, as compared with a case where the fuel is determined to have the prescribed octane number. Therefore, an environment in which a low-temperature oxidation reaction does not occur (or is less likely to occur) is created by raising the temperature of the cylinder by a large amount of internal EGR. Consequently, it is possible to sufficiently suppress an influence of a difference in fuel property (an octane number and a component) on an ignition timing. Thus, even if fuel having a different octane number is used, it is possible to avoid an ignition timing from greatly varying, and it is possible to perform stable HCCI combustion. Further, since the EGR rate is set relatively low, in a case where fuel has a prescribed octane number, it is possible to avoid an excessively large amount of EGR gas from being introduced into the cylinder, and it is possible to stabilize HCCI combustion, while introducing an appropriate amount of EGR gas, in a condition that an ignition timing variation is expected to be suppressed without bringing the cylinder to a sufficiently high temperature state in view of that the octane number is equivalent.

Preferably, the octane number determination unit may determine whether fuel has a prescribed octane number, based on an ignition timing of the fuel when the engine is operated in a predetermined condition.

According to this configuration, since it is not necessary to use an expensive sensor for directly measuring an octane number of fuel, for example, it is possible to reduce an additional cost required for determining an octane number.

Preferably, the combustion control unit may control the EGR device in such a way that an EGR rate at which a coefficient K of an octane index expressed by the following Eq. (1) becomes equal to or larger than a predetermined value is achieved.

$$OI = (1-k) \times RON + K \times MON \qquad (1)$$

where RON denotes a research octane number, and MON denotes a motor octane number.

In this way, when the EGR rate is set in such a way that the coefficient K of the octane index becomes relatively large, it is possible to create an operating condition in which a correlation between an ignition timing and RON is low, and an influence of a low-temperature oxidation reaction is small. Thus, it is possible to advantageously suppress an ignition timing variation due to a difference in fuel property (an octane number and a component).

As another aspect having similar advantageous effects, the combustion control unit may control the EGR device in such a way that an EGR rate at which an ignition timing variation due to a difference in fuel property is suppressed to a predetermined value or smaller is achieved.

Preferably, the combustion control unit may control the EGR device in such a way that an EGR rate at which a torque change amount for each combustion cycle is suppressed to a predetermined value or smaller is achieved.

According to this configuration, it is possible to perform stable HCCI combustion in which a torque change amount for each combustion cycle is small.

Preferably, a geometric compression ratio of the cylinder may be set to be not smaller than 18 but not larger than 22.

According to this configuration, it is possible to appropriately create a high-temperature and high-pressure cylinder environment capable of performing HCCI combustion.

Preferably, the EGR device may be a valve variable mechanism operative to perform internal EGR of letting burnt gas generated in the cylinder remain in the cylinder, as the high-temperature EGR.

According to this configuration, it is possible to securely raise a cylinder temperature by letting high-temperature burnt gas remain in the cylinder.

The invention claimed is:

1. A compression ignition gasoline engine comprising:
   a cylinder for accommodating a piston to be reciprocally movable;
   a fuel injection valve for injecting fuel containing gasoline as a main component into the cylinder;
   an EGR (exhaust gas recirculation) device operative to perform high-temperature EGR of introducing burnt gas generated in the cylinder into the cylinder at a high temperature;
   an octane number determination unit for determining whether fuel injected from the fuel injection valve has a prescribed octane number; and
   a combustion control unit for controlling the fuel injection valve and the EGR device in such a way that HCCI (homogeneous charge compression ignition) combustion in which fuel injected from the fuel injection valve self-ignites within the cylinder occurs, wherein
   the combustion control unit controls the EGR device in such a way that, in at least a partial load operating range in which HCCI combustion is performed, an EGR rate increases, as compared with a case where fuel is determined to have the prescribed octane number, when the octane number determination unit determines that fuel does not have the prescribed octane number; and
   the combustion control unit controls the EGR device in such a way that the EGR rate at which a coefficient K of an octane index (OI) expressed by the following Equation (1) becomes equal to or larger than zero is achieved:

$$OI = (1-K) \times RON + K \times MON \quad (1)$$

where RON denotes a research octane number, and MON denotes a motor octane number.

2. The compression ignition gasoline engine according to claim 1, wherein
   the octane number determination unit determines whether fuel has the prescribed octane number, based on an ignition timing of the fuel when the engine is operated in a predetermined condition.

3. The compression ignition gasoline engine according to claim 1, wherein
   the combustion control unit controls the EGR device in such a way that the EGR rate at which a torque change amount for each combustion cycle is suppressed to a predetermined value or smaller is achieved.

4. The compression ignition gasoline engine according to claim 1, wherein
   a geometric compression ratio of the cylinder is set to be not smaller than 18 but not larger than 22.

5. The compression ignition gasoline engine according to claim 1, wherein
   the EGR device is a valve variable mechanism operative to perform internal EGR of letting burnt gas generated in the cylinder remain in the cylinder, as the high-temperature EGR.

6. The compression ignition gasoline engine according to claim 1, wherein
   the coefficient K is configured to be larger than 1 when the EGR rate is 80%.

7. The compression ignition gasoline engine according to claim 1, wherein
   the coefficient K is configured to decrease proportionally as the EGR rate decreases.

8. The compression ignition gasoline engine according to claim 6, wherein
   the coefficient K is configured to decrease proportionally as the EGR rate decreases.

9. The compression ignition gasoline engine according to claim 1, wherein
   the coefficient K is configured to be substantially equal to zero when the EGR rate is 40%.

10. The compression ignition gasoline engine according to claim 6, wherein
    the coefficient K is configured to be substantially equal to zero when the EGR rate is 40%.

11. The compression ignition gasoline engine according to claim 7, wherein
    the coefficient K is configured to be substantially equal to zero when the EGR rate is 40%.

* * * * *